United States Patent
Arai et al.

(10) Patent No.: US 6,486,920 B2
(45) Date of Patent: Nov. 26, 2002

(54) METHOD AND APPARATUS FOR PRODUCING PROGRAM INFORMATION AND RECEIVING APPARATUS FOR PROCESSING THE PROGRAM INFORMATION

(75) Inventors: Yuko Arai, Tokyo (JP); Takeshi Nagao, Kawaguchi (JP); Kenichi Fujita, Kawasaki (JP); Takayuki Suzuki, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/215,135

(22) Filed: Dec. 18, 1998

(65) Prior Publication Data

US 2002/0073425 A1 Jun. 13, 2002

(30) Foreign Application Priority Data

Dec. 19, 1997 (JP) ............................. 9-364346

(51) Int. Cl.⁷ ............................. H04N 5/445
(52) U.S. Cl. ............ 348/563; 348/564; 348/569; 348/906; 725/39; 725/46; 725/53
(58) Field of Search ............... 348/563, 564, 348/569, 906; 725/39, 40, 41, 42, 43, 44, 45, 46, 47, 48, 49, 50, 51, 52, 53, 54, 55; 386/83

(56) References Cited

U.S. PATENT DOCUMENTS

| | | | | | |
|---|---|---|---|---|---|
| 5,223,924 | A | * | 6/1993 | Strubbe | 725/46 |
| 5,465,113 | A | * | 11/1995 | Gilboy | 348/906 |
| 5,758,259 | A | * | 5/1998 | Lawler | 348/906 |
| 5,805,763 | A | * | 9/1998 | Lawler et al. | 348/13 |
| 6,005,565 | A | * | 12/1999 | Legall et al. | 348/906 |
| 6,081,263 | A | * | 6/2000 | LeGall et al. | 345/327 |
| 6,091,884 | A | * | 7/2000 | Yuen et al. | 386/83 |
| 6,100,884 | A | * | 8/2000 | Tomita et al. | 345/327 |
| 6,263,501 | B1 | * | 7/2001 | Schein et al. | 725/39 |

FOREIGN PATENT DOCUMENTS

JP        08102922        4/1996

* cited by examiner

Primary Examiner—John Miller
Assistant Examiner—Trang U. Tran
(74) Attorney, Agent, or Firm—Lowe Hauptman Gilman & Berner, LLP

(57) ABSTRACT

A program information storing section stores program information including program name, program start time, and channel discriminating information. A program information search section searches the program information stored in the program information storing section according to designated search conditions and produces personalized program information resulting from the search. A program guide display section displays a program guide including a personal channel consisting of the resultant program information. Thus, the receiving apparatus allows users to display their personal channels.

6 Claims, 34 Drawing Sheets

| CHANNEL NAME | NIHON MARU | FUJI SUN | ASAHI | MY CHANNEL |
|---|---|---|---|---|
| 13:00 | PROGRAM ① | ④ | ⑧ | ① |
| 14:00 | ② | ⑤ | ⑨ | ⑤ |
| 15:00 | | ⑥ | ⑩ | ⑩ |
| 16:00 | ③ | | | |
| 17:00 | | ⑦ | ⑪ | ⑦ |

FIG. 3

SERVICE NAME "NIHON MARU"

| PROGRAM NO. | 101 |
|---|---|
| NAME | ① |
| TIME | 13:00-14:00 |
| CONTENTS | ....... |
| FEE | ¥100 |

| PROGRAM NO. | 102 |
|---|---|
| NAME | ② |
| TIME | 14:00-15:30 |
| CONTENTS | ....... |
| FEE | ¥500 |

|  | 103 |
|---|---|
|  | ③ |
|  | ¥250 |

SERVICE NAME "FUJI SUN"

| PROGRAM NO. | 201 |
|---|---|
| NAME | ④ |
| TIME | 13:00-14:00 |
| CONTENTS | ....... |
| FEE | ¥300 |

| PROGRAM NO. | 202 |
|---|---|
| NAME | ⑤ |
| TIME | 14:00-15:00 |
| CONTENTS | ....... |
| FEE | ¥50 |

|  | 203 |
|---|---|
|  | ⑥ |
|  | ¥100 |

SERVICE NAME "MY CHANNEL"

| PROGRAM NO. | 101 |
|---|---|
| NAME | ① |
| TIME | 13:00-14:00 |
| CONTENTS | ....... |
| FEE | ¥100 |

| PROGRAM NO. | 202 |
|---|---|
| NAME | ⑤ |
| TIME | 14:00-15:00 |
| CONTENTS | ....... |
| FEE | ¥50 |

FIG. 4

| CHANNEL NAME | NIHON MARU | FUJI SUN | ASAHI | MY CHANNEL |
|---|---|---|---|---|
| 13:00 | PROGRAM ① | ④ | ⑧ | ① |
| 14:00 | ② | ⑤ | ⑨ | ⑤ |
| 15:00 | | ⑥ | ⑩ | ⑩ |
| 16:00 | ③ | ⑦ | ⑪ | ⑦ |
| 17:00 | | | | |

FIG. 6

| CHANNEL NAME | NIHON MARU | FUJI SUN | ASAHI | MY CHANNEL 1 | MY CHANNEL 2 |
|---|---|---|---|---|---|
| 13:00 | ① | ④ | ⑧ | ① | ① |
| 14:00 | ② | ⑤ | ⑨ | ⑤ | ⑤ |
| 15:00 | | ⑥ | ⑩ | ⑩ | ⑥ |
| 16:00 | ③ | ⑦ | ⑪ | ⑦ | ⑦ |
| 17:00 | | | | | |

FIG. 8

| CHANNEL NAME | NIHON MARU | FUJI SUN | ASAHI | MY CHANNEL |
|---|---|---|---|---|
| 13:00 | ① | ④ | ⑧ | ① |
| 14:00 | ② | ⑤ | ⑨ | ⑤ |
| 15:00 | | | | |
| 16:00 | ③ | ⑥ | ⑩ | ⑩ |
| 17:00 | | ⑦ | ⑪ | ⑪ |

FIG. 9

TODAY'S RECOMMENDED ROUTE

| | CHANNEL 30 | CHANNEL 31 | CHANNEL 32 | CHANNEL 33 |
|---|---|---|---|---|
| 3 | Alarm clock TV ! | Morning news wide | Medical information --influenza-- | Doctor's job 2 |
| 4 | Together with dad | Japanese traditional children's song | World children's song | Today's & Tomorrow's cooking |
| 5 | Let's play in Finnish ! | | | Tomorrow's & next day's cooking -- *meuniere* of Mamakari fish-- |
| 6 | We have no past | I love orange | Weather forecast World weather | |
| 7 | Song show "Dumbo" | 7AM news | Guide to C++ | Reversed morning & noon |
| 8 | Let's go to zoo ! | Traffic information Metropolitan hwy | Guide to A++ | Tigers Fight ! |
| 9 | Let's go to park ! | Traffic information Tomei hwy | Guide to X++ | Stretch exercise |

FIG. 10

| | CHANNEL 30 | CHANNEL 31 | CHANNEL 32 | CHANNEL 33 |
|---|---|---|---|---|
| | TODAY'S RECOMMENDED ROUTE | | | |
| 3 | Alarm clock TV ! ( 0 yen) | Morning news wide | Medical information --influenza-- | Doctor's job 2 |
| 4 | Together with dad | Japanese traditional children's song ( 50 yen) | World children's song | Today's & Tomorrow's cooking |
| 5 | Let's play in Finnish ! | | | Tomorrow's & next day's cooking -- *meuniere* of Mamakari fish-- |
| 6 | We have no past | I love orange | Weather forecast World weather ( 20 yen) | |
| 7 | Song show "Dumbo" | 7AM news | Guide to C++ ( 700 yen) | Reversed morning & noon |
| 8 | Let's go to zoo ! ( 30 yen) | Traffic information Metropolitan hwy | Guide to A++ | Tigers Fight ! |

Total Fee 800 yen

FIG. 11

| SELECT A TIME SHIFT PROGRAM TO BE VIEWED |
|---|
| PROGRAM NAME |
| START |
| IN-HOUSE MAIL |
| GUIDE TO C++ |
| POWDERED TEA MILK & MILK COCOA |
| STRETCH EXERCISE & DUMBBELL EXERCISE |
| HOW TO MAKE A CALENDER & HOW TO TRASH |
| YEAR-END CLEANING, NEW YEAR'S COOKING, WOMEN'S BUSY DAY |

| START SCHEDULING | CANCEL |
|---|---|

FIG. 12

TODAY'S RECOMMENDED ROUTE

|   | CHANNEL 30 | CHANNEL 31 | CHANNEL 32 | CHANNEL 33 |
|---|---|---|---|---|
| 3 | Alarm clock TV ! (0 yen) | Morning news wide | Medical information --influenza-- | Doctor's job 2 |
| 4 | Together with dad | Japanese traditional children's song (50 yen) | World children's song | Guide to C++ (800 yen) |
| 5 | Let's play in Chinese ! |  |  | Tomorrow's & next day's cooking -- *meuniere* of Mamakari fish-- |
| 6 | We have no past | I love orange | Weather forecast World weather (20 yen) |  |
| 7 | Song show "Dumbo" | 7AM news | Guide to C++ (700 yen) | Reversed morning & noon |
| 8 | Let's go to zoo ! (30 yen) | Traffic information Metropolitan hwy | Guide to A++ | Tigers Fight ! |

Total Fee 800 yen

[ Previous Route ] [ Next Route ]

FIG. 13

TODAY'S RECOMMENDED ROUTE

|   | CHANNEL 30 | CHANNEL 31 | CHANNEL 32 | CHANNEL 33 |
|---|---|---|---|---|
| 3 | Alarm clock TV ! (0 yen) | Morning news wide | Medical information --influenza-- | Doctor's job 2 |
| 4 | Together with dad | Japanese traditional children's song (50 yen) | World children's song | Guide to C++ (800 yen) |
| 5 | Let's play in Chinese! (50 yen) |  |  | Tomorrow's & next day's cooking -- *meuniere* of Mamakari fish-- |
| 6 | We have no past | I love orange | Weather forecast World weather (20 yen) |  |
| 7 | Song show "Dumbo" | 7AM news (0 yen) | Guide to C++ (700 yen) | Reversed morning & noon |
| 8 | Let's go to zoo ! (30 yen) | Traffic information Metropolitan hwy | Guide to A++ | Tigers Fight ! |

Total Fee 900 yen

[ Previous Route ] [ Next Route ]

FIG. 14

| SEARCH RESULT ID | 1 | 2 | 3 |
|---|---|---|---|
| CHANNEL ID | 30 | 30 | ... |
| PROGRAM NO. | 100 | 100 | ... |
| NAME | Alarm clock TV ! | Alarm clock TV ! | ... |
| TIME | 3:00-4:00 | 3:00-4:00 | ... |
| FEE | 0 YEN | 0 YEN | ... |
| CHANNEL ID | 31 | 33 | ... |
| PROGRAM NO. | 130 | 140 | ... |
| NAME | Japanese traditional children's song | Guide to C++ | ... |
| TIME | 4:00-6:00 | 4:00-5:00 | ... |
| FEE | 50 YEN | 800 YEN | ... |
| CHANNEL ID | 32 | 30 | ... |
| PROGRAM NO. | 1200 | 1201 | ... |
| NAME | WR・World weather | Let's play in Chinese ! | ... |
| TIME | 6:00-7:00 | 5:00-6:00 | ... |
| FEE | 20 YEN | 50 YEN | ... |
| CHANNEL ID | 32 | 32 | ... |
| PROGRAM NO. | 1201 | 1200 | ... |
| NAME | Guide to C++ | WR・World weather | ... |
| TIME | 7:00-8:00 | 6:00-7:00 | ... |
| FEE | 700 YEN | 20 YEN | ... |
| CHANNEL ID | 30 | 31 | ... |
| PROGRAM NO. | 103 | 230 | ... |
| NAME | Let's go to zoo ! | 7AM News | ... |
| TIME | 8:00-9:00 | 7:00-8:00 | ... |
| FEE | 30 YEN | 0 YEN | ... |
| CHANNEL ID | ... | 30 | ... |
| PROGRAM NO. | ... | 103 | ... |
| NAME | ... | Let's go to zoo ! | ... |
| TIME | ... | 8:00-9:00 | ... |
| FEE | ... | 30 YEN | ... |

FIG. 15

| PROGRAM NO. | 2 | | | | |
|---|---|---|---|---|---|
| ES TYPE | VIDEO | AUDIO | AUDIO | VIDEO | DATA |
| PROGRAM / ADVERTISEMENT STREAM | PROGRAM | PROGRAM | ADVERTISEMENT STREAM | ADVERTISEMENT STREAM | ADVERTISEMENT STREAM |
| ES PACKET ID | 122 | 455 | 788 | 200 | 199 |

FIG. 16

NOW DECODING VIDEO (ES PACKET ID:122) AND AUDIO (ES PACKET ID: 455)

FIG. 17

| | CHANNEL 30 | CHANNEL 31 | CHANNEL 32 |
|---|---|---|---|
| 3 | Alarm clock TV ! | Morning news wide | Medical information --influenza-- |
| 4 | Together with dad | Japanese traditional children's song | World children's song |
| 5 | Let's play in Finnish ! | | |
| 6 | We have no past | I love orange | Weather forecast World weather |
| 7 | Song show "Dumbo" | 7AM news | Guide to C++ |
| 8 | Let's go to zoo ! | Traffic information Metropolitan hwy | Guide to A++ |
| 9 | Let's go to park ! | Traffic information Tomei hwy | Guide to X++ |

TODAY'S PROGRAM GUIDE

Good Morning !

A

FIG. 18
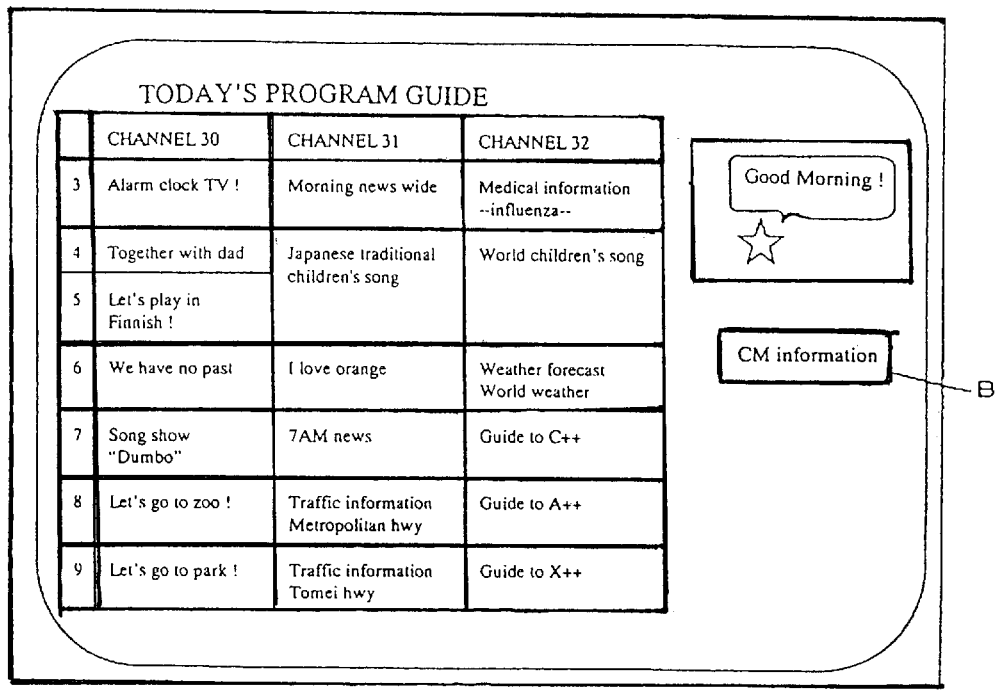
Display sponsor news (C) by selection of "CM information" of B
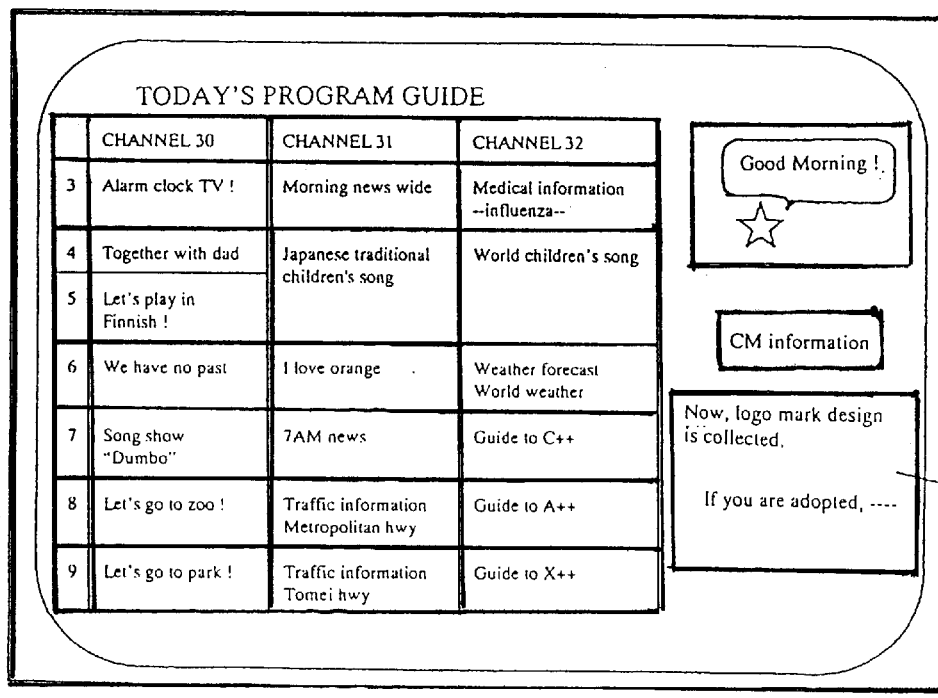

FIG. 19
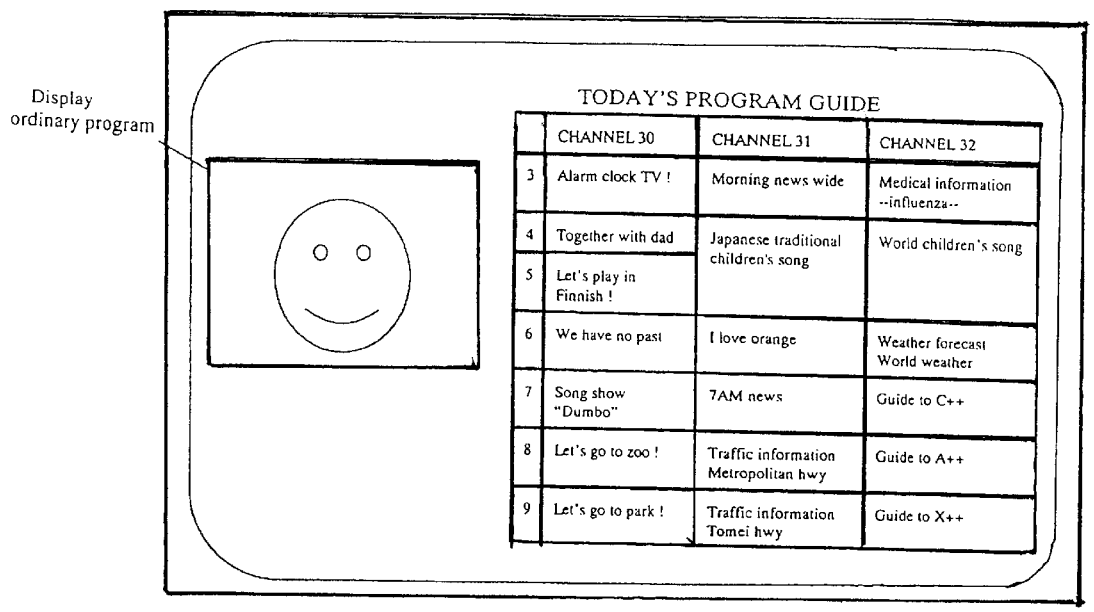
FIG. 20
EVENT INFORMATION
| SERVICE_ID | 30 | | | | |
|---|---|---|---|---|---|
| TS_ID | 130 | | | | |
| PROGRAM_ID | 30 | 35 | 40 | 42 | ... |
| PROGRAM NAME | Alarm clock TV! | Together with dad | Let's play in Finnish ! | We have no past | ... |
| START TIME | 97/11/14 3:00 | 97/11/14 4:00 | 97/11/14 5:00 | 97/11/14 6:00 | ... |
| DURATION | 60 min | 60 min | 60 min | 60 min | ... |
| SPONSOR ID | 1 | 2 | 5 | 10 | ... |
| NAME | Umeshita Electric | ABCDE | Asatte TV | Mainichi gokuraku | ... |
FIG. 21
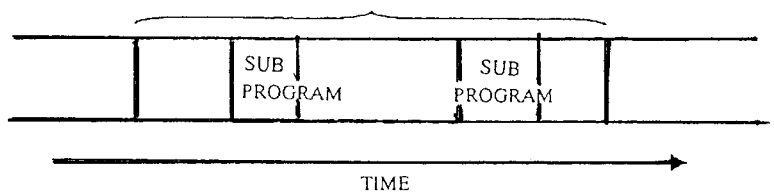

FIG. 22

| | CHANNEL 30 | CHANNEL 31 | CHANNEL 32 | CHANNEL 33 |
|---|---|---|---|---|
| 3 | Alarm clock TV ! | Morning news wide | Medical information --influenza-- | Doctors job 2 |
| | Umeshita Electric | Oimo Bank | Koala Motors | White Bear Dep. |
| 4 | Together with dad | Japanese traditional children's song | World children's song | Today's & Tomorrow's cooking |
| | ABCDE | | | Sunsun Publisher |
| 5 | Let's play in Finnish ! | | | Tomorrow's & next day's cooking -- *meuniere* of Mamakari fish-- |
| | Asatte TV | Orange park | Tomato Const. | |
| 6 | We have no past | I love orange | Weather forecast World weather | |
| | Mainichi Gokuraku | Yaoya | Tanuki Udon | ABC data |

TODAY'S PROGRAM GUIDE

FIG. 23

EVENT INFORMATION

| Service ID | 30 | | | | |
|---|---|---|---|---|---|
| TS_ID | 130 | | | | |
| Program_ID | 30 | 35 | 40 | 42 | ... |
| Program Name | Alarm clock TV! | Together with dad | Let's play in Finnish! | We have no past | ... |
| Start Time | 97/11/14 3:00 | 97/11/14 4:00 | 97/11/14 5:00 | 97/11/14 6:00 | ... |
| DURATION | 60 min | 60 min | 60 min | 60 min | ... |
| CM_ID | 135 | 20 | 1 | 9 | ... |

FIG. 24

CM INFORMATION

| SERVICE_ID | 30 | | | | |
|---|---|---|---|---|---|
| TS_ID | 130 | | | | |
| CM_ID | 130 | 135 | 140 | 142 | ... |
| CM NAME | Thanks | Goodby | Morning | Sir | ... |
| START TIME | 97/11/13 13:01 | 97/11/13 13:15 | 97/11/13 13:30 | 97/11/13 13:47 | ... |
| DURATION | 1 min | 0.5 min | 0.3 min | 1 min | ... |

FIG. 25

CM RECORDING MANAGEMENT TABLE

| CM_ID | 130 | 135 | 140 | 142 | ... |
|---|---|---|---|---|---|
| CM NAME | Thanks | Goodby | Morning | Sir | ... |
| File ID | 100 | 567 | 12 | 654 | |
| DURATION | 1 min | 0.5 min | 0.3 min | 1 min | ... |

FIG. 26

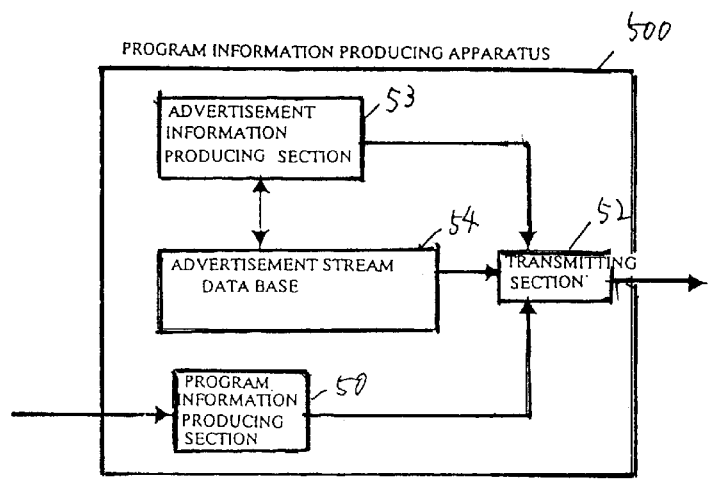

FIG. 32

EIT (Event Information Table)

| SERVICE_ID | 30 | | | | |
|---|---|---|---|---|---|
| T S_ID | 130 | | | | |
| PROGRAM_ID | 30 | 35 | 40 | 42 | ... |
| PROGRAM NAME | Alarm clock TV! | Together with dad | Let's play in Finnish ! | We have no past | ... |
| START TIME | 97/11/14 3:00 | 97/11/14 4:00 | 97/11/14 5:00 | 97/11/14 6:00 | ... |
| DURATION | 60 min | 60 min | 60 min | 60 min | ... |
| RECORDING FEE — WITH CM | 20 yen | 0 yen | 0 yen | 150 yen | ... |
| RECORDING FEE — CM SKIP | 200 yen | 100 yen | 40 yen | 500 yen | ... |
| PLAYBACK FEE WITH CM FAST FORWARDING | 50 yen | 30 yen | 35 yen | 400 yen | ... |
| VIEWING FEE WITH CM | 10 yen | 0 yen | 0 yen | 100 yen | ... |
| FEE WITH CM SKIP | 190 yen | 90 yen | 20 yen | 300 yen | ... |

FIG. 33

CM POSITIONAL INFORMATION

| SERVICE_ID | 30 | | | | |
|---|---|---|---|---|---|
| T S_ID | 130 | | | | |
| CM_ID | 130 | 135 | 140 | 142 | ... |
| CM NAME | Thanks | Goodby | Morning | Sir | ... |
| START TIME | 97/11/14 3:01 | 97/11/14 3:15 | 97/11/14 3:30 | 97/11/14 3:47 | ... |
| DURATION | 1 min | 0.5 min | 0.3 min | 1 min | ... |

FIG. 34

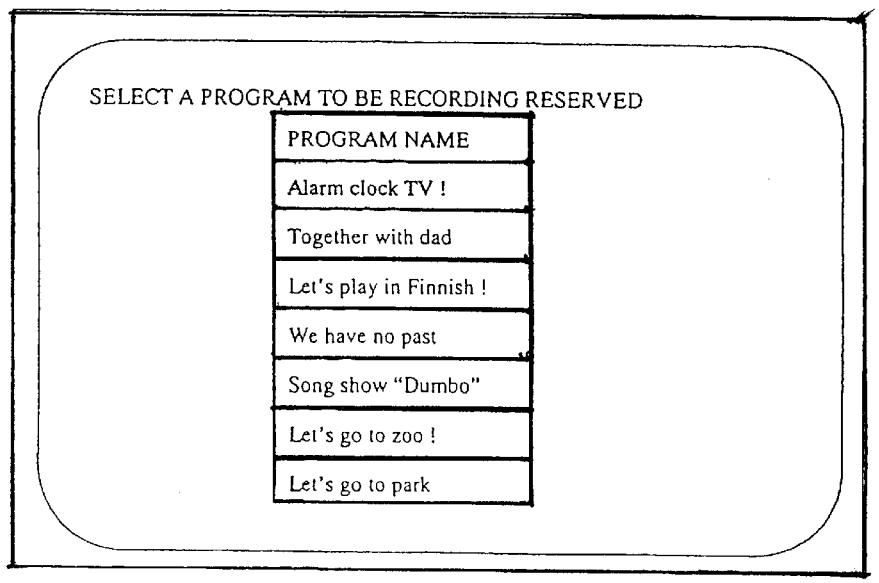

FIG. 35

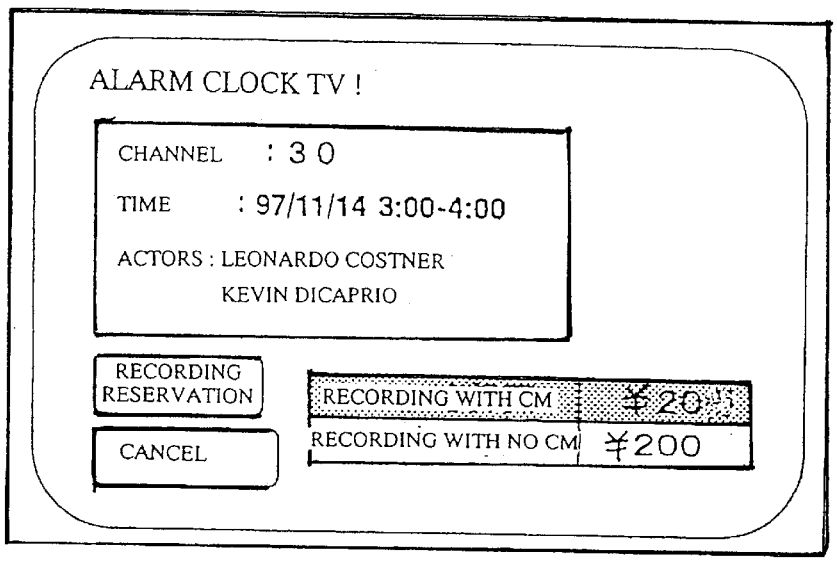

FIG. 36

EIT (Event Information Table)

| SERVICE_ID | 30 | | | | |
|---|---|---|---|---|---|
| T S_ID | 130 | | | | |
| PROGRAM_ID | 30 | 35 | 40 | 42 | ... |
| PROGRAM NAME | Alarm clock TV! | Together with dad | Let's play in Finnish! | We have no past | ... |
| START TIME | 97/11/14 3:00 | 97/11/14 4:00 | 97/11/14 5:00 | 97/11/14 6:00 | ... |
| DURATION | 60 min | 60 min | 60 min | 60 min | ... |
| CM PLAYBACK | 20 times | 3 times | 1 time | 10 times | ... |

FIG. 37

PROGRAM RECORDING MANAGEMENT TABLE

| PROGRAM_ID | 30 | | | | |
|---|---|---|---|---|---|
| PROGRAM NAME | Alarm clock TV! | | | | |
| RECORDING PROGRAM FILE ID | 500 | 300 | 200 | 99 | ... |
| DURATION | 1 min | 13 min | 14.5 min | 16.7 min | ... |

FIG. 38

CM RECORDING MANAGEMENT TABLE

| CM_ID | 130 | 135 | 140 | 142 | ... |
|---|---|---|---|---|---|
| CM NAME | Thanks | Goodby | Morning | Sir | ... |
| RECORDING CM FILE ID | 502 | 301 | 199 | 165 | ... |
| DURATION | 1 min | 0.5 min | 0.3 min | 1 min | ... |

FIG. 39

PROGRAM CM PLAYBACK ORDER TABLE

| PROGRAM_ID | 30 | | | | |
|---|---|---|---|---|---|
| PROGRAM NAME | Alarm clock TV ! | | | | |
| PLAYBACK ORDER | 1 | 2 | 3 | 4 | ... |
| PROGRAM / CM | PROGRAM | CM | PROGRAM | CM | |
| PROGRAM_ID / CM_ID | 30 | 130 | 30 | 135 | ... |
| FILE ID OF RECORDING PROGRAM / CM | 500 | 300 | 502 | 301 | ... |

FIG. 40

CM PLAYBACK FREQUENCY TABLE

| PROGRAM_ID | 30 | ... |
|---|---|---|
| PROGRAM NAME | Alarm clock TV ! | ... |
| PRESENT PLAYBACK FREQUENCY | 15 | ... |
| MANDATORY PLAYBACK FREQUENCY | 20 | ... |

FIG. 41

CM POSITION TABLE

| PROGRAM_ID | 30 | | | | |
|---|---|---|---|---|---|
| CM_ID | 130 | 135 | 140 | 142 | ... |
| CM NAME | Thanks | Goodby | Morning | Sir | ... |
| CM POSITION | 20 min | 30 min | 30.5 min | 48 min | ... |
| DURATION | 1 min | 0.5 min | 0.3 min | 1 min | ... |

FIG. 42

PROGRAM CM RECORDING MANAGEMENT TABLE

| PROGRAM_ID | 30 | ... |
|---|---|---|
| PROGRAM NAME | Alarm clock TV ! | ... |
| RECORDING PROGRAM FILE ID | 1500 | ... |
| DURATION | 60 min | ... |

FIG. 49
NEXT PROGRAM INFORMATION
| SERVICE_ID | 5 |
|---|---|
| TS_ID | 20 |
| PROGRAM_ID | 50 |
| PROGRAM NAME | Noon news |
| START TIME | 97/12/02 12:15 |
| DURATION | 45 min |
| MESSAGE TIMING | 10 SEC BEFORE PROGRAM END |
FIG. 50
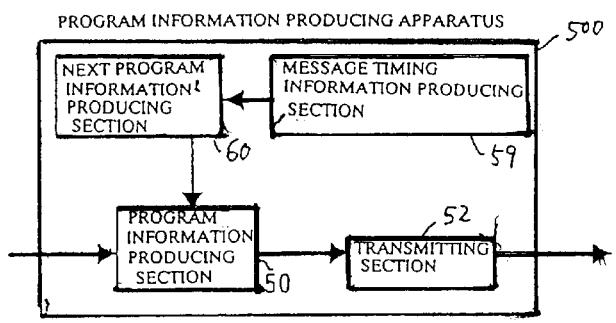
FIG. 51
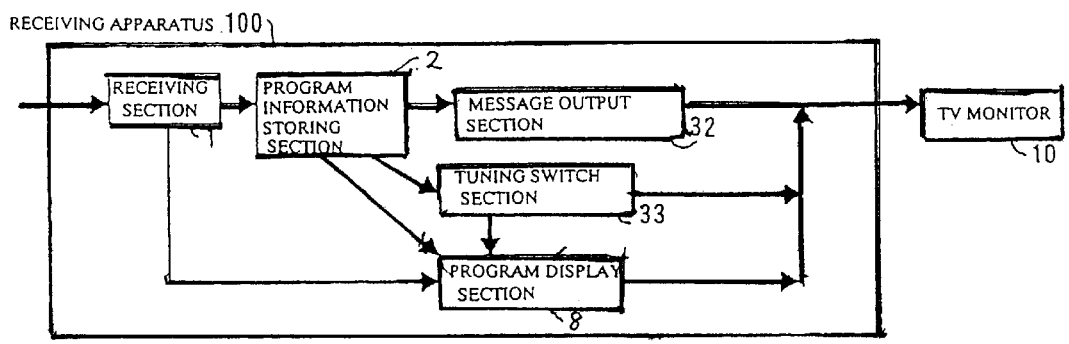
FIG. 52
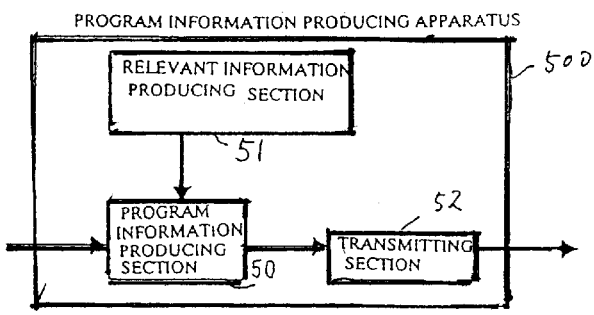

FIG. 53

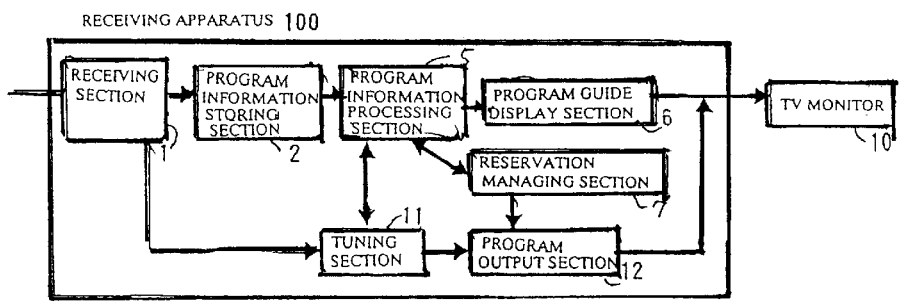

FIG. 54

| PROGRAM NO. | 10 | | |
|---|---|---|---|
| COMPONENT TYPE | VIDEO | AUDIO | MPEG2 PRIVATE SECTION |
| PID | 100 | 101 | 102 |

FIG. 55

| PROGRAM INFORMATION RELATED DATA TYPE | PROGRAM RESERVATION | |
|---|---|---|
| DISPLAY START TIME | DEC. 4, 1997, 10:10 | |
| DISPLAY END TIME | DEC. 4, 1997, 10:12 | |
| DISPLAY POSITION(COORDINATE OF CENTER) | (300, 200) | |
| PROGRAM IDENTIFYING INFORMATION | SERVICE IDENTIFIER | 100 |
| | PROGRAM IDENTIFIER | 10000 |
| | PROGRAM START TIME | DEC. 5, 01:05 |

FIG. 56

| PROGRAM NO. | 10 |
|---|---|
| COMPONENT TYPE | MPEG2 PRIVATE SECTION |
| PID | 102 |

FIG. 57

| PROGRAM INFORMATION RELATED DATA TYPE | PROGRAM GUIDE DISPLAY |
|---|---|
| DISPLAY START TIME | DEC. 4, 1997, 11:10 |
| DISPLAY END TIME | DEC. 4, 1997, 11:12 |
| DISPLAY POSITION (CENTRAL POSITION) | (300 200) |
| CHANNEL LIST | 100 |
| | 101 |
| | 102 |
| | 103 |
| PROGRAM START TIME | DEC. 4, 1997, 11:00 |
| PROGRAM TABLE TIME DURATION | 3 HOURS |

FIG. 58

| PROGRAM NO. | 10 | |
|---|---|---|
| COMPONENT TYPE | AUDIO | MPEG2 PRIVATE SECTION |
| PID | 101 | 102 |

FIG. 59

| PROGRAM INFORMATION RELATED DATA TYPE | OTHER CHANNEL VIDEO DISPLAY |
|---|---|
| DISPLAY START TIME | DEC. 4, 1997, 11:10 |
| DISPLAY END TIME | DEC. 4, 1997, 11:12 |
| DISPLAY POSITION (CENTER POSITION) | (300, 200) |
| CHANNEL LIST | 100<br>101<br>102<br>103 |

FIG. 60

| NETWORK_ID | 5 | | |
|---|---|---|---|
| TS_ID | 20 | 30 | 40 |
| TUNING INFORMATION | 23.5 | 50.1 | 67.8 |

FIG. 61

| BROADCASTER IDENTIFIER | 20 | | | | | |
|---|---|---|---|---|---|---|
| BROADCASTER NAME | RYUKUN TELEVISION | | | | | |
| TS_ID | 30 | | | 40 | | |
| CHANNEL IDENTIFIER | 4 | 5 | 6 | 7 | 8 | 9 |

FIG. 62

| SERVICE_ID | 4 | | | | |
|---|---|---|---|---|---|
| TS_ID | 30 | | | | |
| PROGRAM_ID | 30 | 35 | 40 | 42 | 89 |
| PROGRAM NAME | Morning weather | Monocycle | Morning news | Morning vegetable | Get up! |
| START TIME | 97/11/14 4:00 | 97/11/14 5:00 | 97/11/14 6:00 | 97/11/14 7:00 | 97/11/14 8:00 |
| PROGRAM DURATION | 60 min | 60 min | 60 min | 60 min | 60 min |

| T S_ID | 3 0 | | |
|---|---|---|---|
| SERVICE_ID | 4 | 5 | 6 |
| SERVICE NAME | Movie channel | kid's TV | News |
| SERVICE TYPE | NVOD | Digital TV | FM Radio |

| T S_ID | 4 0 | | |
|---|---|---|---|
| SERVICE_ID | 7 | 8 | 9 |
| SERVICE NAME | Sports ch | Wife's TV | Cartoon kingdom |
| SERVICE TYPE | Digital TV | Digital TV | Digital TV |

FIG. 65

DIGITAL BS PROGRAM INFORMATION

| SERVICE_ID | 300 | | | | |
|---|---|---|---|---|---|
| T S_ID | 130 | | | | |
| PROGRAM_ID | 30 | 35 | 40 | 42 | ... |
| PROGRAM NAME | Alarm clock TV! | Together with dad | Let's play in Finnish ! | We have no past | ... |
| START TIME | 97/11/14 3:00 | 97/11/14 4:00 | 97/11/14 5:00 | 97/11/14 6:00 | ... |
| DURATION | 60 min | 60 min | 60 min | 60 min | ... |
| FEE | 200 yen | 0 yen | 500 yen | 30 yen | ... |

FIG. 66

ANALOG BS PROGRAM INFORMATION

| CHANNEL NO. | BS30 | | | | |
|---|---|---|---|---|---|
| TUNING INFO. | 130. 55 | | | | |
| PROGRAM_ID | 230 | 235 | 240 | 242 | ... |
| PROGRAM NAME | (Nothing) | Together with grandpa | Let's play in Chinese ! | We have no future | ... |
| START TIME | (Nothing) | 97/11/14 4:00 | 97/11/14 5:00 | 97/11/14 6:00 | ... |
| DURATION | (Nothing) | 60 min | 60 min | 60 min | ... |
| REFERRED DIGITAL BS PROGRAM_ID | 30 | (Nothing) | (Nothing) | (Nothing) | ... |
| FEE | 50 yen | 0 yen | 0 yen | 0 yen | ... |

FIG. 67

ANALOG BS PROGRAM GUIDE

| | BS 30 | BS 31 | BS 32 | BS 33 |
|---|---|---|---|---|
| 3 | Alarm clock TV ! | Morning news wide | Medical information --influenza-- | Doctor's job 2 |
| 4 | Together with grandpa | Japanese traditional children's song | World children's song | Today's & Tomorrow's cooking |
| 5 | Let's play in Chinese ! | | | Tomorrow's & next day's cooking -- *meuniere* of Mamakari fish-- |
| 6 | We have no future | I love orange | Weather forecast World weather | |
| 7 | Song show "Dumbo" | 7AM news | Guide to C++ | Reversed morning & noon |
| 8 | Let's go to zoo ! | Traffic information Metropolitan hwy | Guide to A++ | Tigers Fight ! |
| 9 | Let's go to park ! | Traffic information Tomei hwy | Guide to X++ | Stretch exercise |

FIG. 68
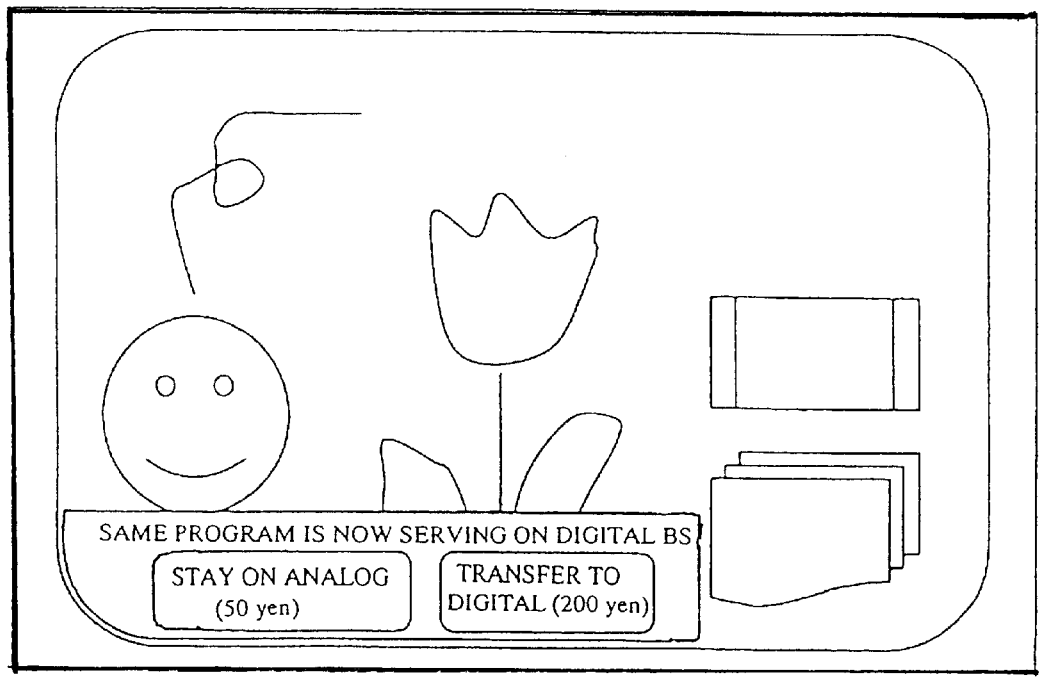
FIG. 69
ANALOG BS PROGRAM INFORMATION
| CHANNEL NO | BS30 |
|---|---|
| TUNING INFORMATION | 130. 55 |
| REFERRED DIGITAL BS SERVICE_ID | 300 |
FIG. 70
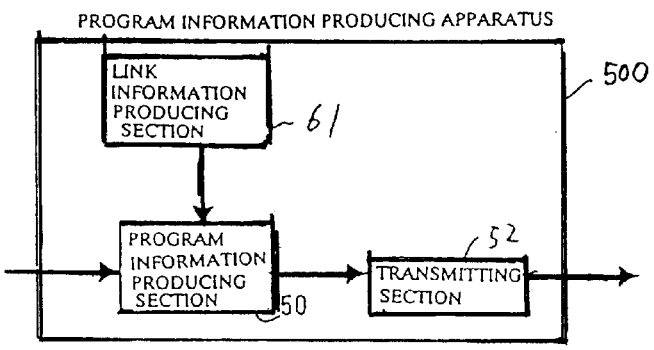

METHOD AND APPARATUS FOR PRODUCING PROGRAM INFORMATION AND RECEIVING APPARATUS FOR PROCESSING THE PROGRAM INFORMATION

BACKGROUND OF THE INVENTION

The present invention relates to a broadcast system for broadcasting program information multiplexed with audio and video data, and more particularly to the program information producing apparatus and method for producing program information to be broadcasted, and a related receiving apparatus for displaying a program guide based on the received program information.

Unexamined Japanese Patent Application No. Kokai 7-160732 discloses a program guide display technique, wherein predetermined search or retrieval conditions are given to display a rearranged program information in accordance with the agreement between the program information and the given search or retrieval conditions. However, this program guide display technique has no function for displaying the searched or retrieved programs as a channel and has no advanced navigation function. Unexamined Japanese Patent Application No. Kokai 8-340310 discloses an advertisement data display technique, wherein the advertisement is displayed in a limited time slot designated by display start and end times included in the advertisement data. However, this advertisement data display technique does not consider the coexistence of the program guide and the advertisement data. Unexamined Japanese Patent Application No. Kokai 9-46648 discloses a CM recording technique, wherein the time codes multiplexed with CM data are used to remove unnecessary portions in the program recording.

SUMMARY OF THE INVENTION

An object of the present invention is to provide a receiving apparatus capable of displaying a personalized channel collecting user's preferable or receiver's own program information in addition to common channels.

Another object of the present invention is to provides a broadcast system capable of establishing cooperative coexistence in the relationship between the program guide display and the CM or program broadcasting, or sponsor information.

Another object of the present invention is to provides a broadcast system capable of setting a variety of fees corresponding to program ranks and providing fine services in accordance with the fees.

Another object of the present invention is to provides a broadcast system allowing users or receivers to smoothly select a next program after finishing a present program.

Another object of the present invention is to provides a broadcast system capable of controlling the display of program guides (including the control of display start time and display position) or performing the promotion using other channels, thereby providing an advanced scheme for reserving or tuning the programs.

Another object of the present invention is to provides a broadcast system capable of linking program information between different networks when the same program is broadcasted through digital and analog channels in the simulcast services.

To accomplish the above and other related objects, the present invention provides a program information producing system for producing and transmitting improved program information as well as an advanced receiving system for processing the program information. The present invention realizes support for user's selection of programs, establishes the coexistence between the program guide display and the CM/program broadcasting, allows the sponsors to provide fine services according to recording/viewing fees, gives a flexible scheme for reserving and tuning the programs, and correlates the program guides between different networks. The present invention discloses the detailed arrangement of the apparatus and method for realizing the above system.

One aspect of the present invention provides a receiving apparatus comprising a program information storing section for storing program information including program name, program start time and channel discriminating information, a program information search section for searching the program information stored in the program information storing section according to designated search conditions and for producing personalized program information resulting from the search, and a program guide display section for displaying a program guide including a personal channel including the personalized program information. With this arrangement, it becomes possible to display a user's personal channel.

Another aspect of the present invention provides a program information producing apparatus comprising a program related information producing section for producing program related information, and means for producing both program information and the program related information or producing program information including the program related information.

Another aspect of the present invention provides a receiving apparatus comprising an advertisement information storing section for storing advertisement information, and a display section for outputting an advertisement stream to a limited space on a screen when a program guide is displayed on the screen, the advertisement stream being referred to by the advertisement information.

Furthermore, another aspect of the present invention provides a program information producing apparatus comprising a program information producing section for producing ordinary program information, and a sub program information producing section for producing sub program information including sub program identification data and sub program position data. With this arrangement, it becomes possible to provide a program guide including the sub program on a screen of the receiving apparatus.

Furthermore, another aspect of the present invention provides a receiving apparatus comprising a sub program search section for accessing sub programs to search a relevant sub program with reference to sub program reference information of a viewed broadcasted program, and a program guide display section for displaying the relevant sub program by using a limited space of a screen when a program guide is displayed on the screen.

Furthermore, another aspect of the present invention provides a program information producing apparatus comprising a charge information producing section for adding program recording fees to program information, the program recording fees including a plurality of ranks classified in accordance with a recording or viewing type of a sub program. With this arrangement, it becomes possible to set a variety of charge ranks according to the recording or viewing type of the sub program (e.g., CM and preview).

Furthermore, another aspect of the present invention provides a receiving apparatus comprising a program recording section for recording a sub program together with an ordinary program when a recording request includes both of the ordinary and sub programs and for recording only the ordinary program by skipping the sub program when the recording request includes only the ordinary program, and a charging section for differentiating a recording fee in accordance with the inclusion of the sub program in the recording of the ordinary program.

Furthermore, another aspect of the present invention provides a program information producing apparatus comprising a program information producing section for producing ordinary program information, and a sub program playback frequency information producing section for producing program information describing a mandatory playback frequency of a recorded ordinary program performed without skipping a sub program.

Furthermore, another aspect of the present invention provides a receiving apparatus comprising a program recording section for recording an ordinary program and a sub program separately, a playback order table producing section for producing an ordinary/sub program playback order table describing a playback order of the ordinary program and the sub program, and a program playback section for reproducing the ordinary program and the sub program in accordance with the ordinary/sub program playback order table.

Furthermore, another aspect of the present invention provides a receiving apparatus comprising a sub program position table producing section for producing a sub program position table describing the position of a sub program in an ordinary program, a program playback section for reproducing both the ordinary program and the sub program when a playback request includes both of the ordinary and sub programs and for reproducing only the ordinary program by skipping the sub program with reference to the sub program position table when the playback request includes only the ordinary program.

Furthermore, another aspect of the present invention provides a program information producing apparatus comprising a next program information producing section for producing program information of a next program to be tuned in to during or after the broadcasting of a program. With this arrangement, it becomes possible to allow each user to select a favorite next program or realize an automatic tuning operation by the receiving apparatus.

Furthermore, another aspect of the present invention provides a receiving apparatus comprising a tuning switch section for tuning in to a next program in accordance with next program information during or after the broadcasting of a program.

Furthermore, another aspect of the present invention provides a receiving apparatus characterized in that a program guide, or content of the program guide, or a display method of the program guide is differentiated in accordance with a presently broadcasted program.

Furthermore, another aspect of the present invention provides a program information producing apparatus comprising a relevant information producing section for producing program information related data as one component constituting a program, the program information related data being used for display and control of the program information, thereby transmitting the program information in connection with the content of the program. With this arrangement, it becomes possible for the receiving apparatus to reserve or tune a program based on the program information related data.

Furthermore, another aspect of the present invention provides a receiving apparatus comprising a receiving section for receiving program information related data including a list of channels to be displayed, and a program guide display section for displaying a program guide including designated channels.

Furthermore, another aspect of the present invention provides a program information producing apparatus comprising a program information producing section for producing ordinary program information, and a link information producing section for producing program link information or channel link information indicating that a subjective program or channel is identical in content with a program or channel described in the program information of a channel group transmitted by using a different method. With this arrangement, it becomes possible to allow each user to check the difference between the linked channels in their program contents, fees and qualities when the same program is broadcasted in both analog and digital channels.

Furthermore, another aspect of the present invention provides a receiving apparatus comprising a receiving section for receiving a subjective program or channel with program information including program link information or channel link information, and a program guide display section for displaying a program guide including the content of another program or channel having identical program link information or channel link information as that of the subjective program or channel.

BRIEF DESCRIPTION OF THE DRAWINGS

The above and other objects, features and advantages of the present invention will become more apparent from the following detailed description which is to be read in conjunction with the accompanying drawings, in which:

FIG. 3 is a view showing personalized program information resulting from the search conducted under a given search condition in accordance with the first embodiment of the present invention;

FIG. 4 is a program guide displayed by a program guide display section in accordance with the first embodiment of the present invention;

FIG. 6 is another program guide displayed by the program guide display section in accordance with the first embodiment of the present invention;

FIG. 8 is a program guide resultant from a re-conducted search which is performed so as to include a viewer's designating program in accordance with the second embodiment of the present invention;

FIG. 9 is a screen display showing a program guide distinctively exhibiting selected programs in accordance with the second embodiment of the present invention;

FIG. 10 is a screen display showing a program guide displaying program names together with charging fees in accordance with the first embodiment of the present invention;

FIG. 11 is a screen display showing selectable time shift programs in accordance with a third embodiment of the present invention;

FIG. 12 is a screen display showing a program guide including the selected time shift program in accordance with the third embodiment of the present invention;

FIG. 13 is a screen display showing another program guide including the selected time shift program in accordance with the third embodiment of the present invention;

FIG. 14 is a table showing program information obtained through scheduling in accordance with the third embodiment of the present invention;

FIG. 15 is a table showing program information used in a fourth embodiment of the present invention;

FIG. 16 is a screen display showing decoded video and text data used in the fourth embodiment of the present invention;

FIG. 17 is a screen display showing a program guide with displayed CM information used in the fourth embodiment of the present invention;

FIG. 18 is a screen display showing another program guide with displayed CM information used in the fourth embodiment of the present invention;

FIG. 19 is a screen display showing a downsized ordinary program guide displayed together with a program guide in accordance with a fifth embodiment of the present invention;

FIG. 20 is a table showing event information serving as one of the program information in accordance with a sixth embodiment of the present invention;

FIG. 21 is a view showing a relationship between a program and sub programs

FIG. 22 is a screen display showing a program guide displaying program names together with sponsor names used in the sixth embodiment of the present invention;

FIG. 23 is a table showing another event information serving as one of the program information used in a seventh embodiment of the present invention;

FIG. 24 is a table showing CM information used in the seventh embodiment of the present invention;

FIG. 25 is a table showing a CM recording management table used in the seventh embodiment of the present invention;

FIG. 26 is a block diagram showing the arrangement of a program information producing apparatus in accordance with the fourth embodiment of the present invention;

FIG. 32 is a table showing another event information serving as one of the program information used in an eighth embodiment of the present invention;

FIG. 33 is a table showing CM positional information used in the eighth embodiment of the present invention;

FIG. 34 is a screen display showing a reservation list used for recording programs in accordance with the eighth embodiment of the present invention;

FIG. 35 is a screen display used for requiring selection of the CM recording type used in the eighth embodiment of the present invention;

FIG. 36 is a table showing program information used in a ninth embodiment of the present invention;

FIG. 37 is a table used for managing the program recording used in the ninth embodiment of the present invention;

FIG. 38 is a table used for managing the CM recording used in the ninth embodiment of the present invention;

FIG. 39 is a table indicating playback order of programs and CMs used in the ninth embodiment of the present invention;

FIG. 40 is a table describing CM playback frequency used in the ninth embodiment of the present invention;

FIG. 41 is a table describing CM positional information used in a tenth embodiment of the present invention;

FIG. 42 is a table used for managing the recorded programs and CMs used in the tenth embodiment of the present invention;

FIG. 49 is a table showing next program information used in the eleventh embodiment of the present invention;

FIG. 50 is a block diagram showing the arrangement of a program information producing apparatus in accordance with the eleventh embodiment of the present invention;

FIG. 51 is a block diagram showing the arrangement of a receiving apparatus in accordance with the eleventh embodiment of the present invention;

FIG. 52 is a block diagram showing the arrangement of a program information producing apparatus in accordance with a twelfth embodiment of the present invention;

FIG. 53 is a block diagram showing the arrangement of a receiving apparatus in accordance with the twelfth embodiment of the present invention;

FIG. 54 is a table showing a first example of a component arrangement used in a thirteenth embodiment of the present invention;

FIG. 55 is a table showing a first example of program information related data used in the thirteenth embodiment of the present invention;

FIG. 56 is a table showing a second example of the component arrangement used in a fourteenth embodiment of the present invention;

FIG. 57 is a table showing a second example of the program information related data used in the fourteenth embodiment of the present invention;

FIG. 58 is a table showing a third example of the component arrangement used in a fifteenth embodiment of the present invention;

FIG. 59 is a table showing a third example of the program information related data used in the fifteenth embodiment of the present invention;

FIG. 60 is a table showing network information, serving as part of common program information, used in the twelfth embodiment of the present invention;

FIG. 61 is a table showing a correlation between a broadcaster and channels, serving as part of the common program information, used in the twelfth embodiment of the present invention;

FIG. 62 is a table showing a program broadcast schedule of each channel, serving as part of uncommon program information, used in the twelfth embodiment of the present invention;

FIG. 65 is a table showing digital BS program information used in a sixteenth embodiment of the present invention;

FIG. 66 is a table showing analog BS program information used in the sixteenth embodiment of the present invention;

FIG. 67 is a screen view showing an analog BS program guide in accordance with the sixteenth embodiment of the present invention;

FIG. 68 is a screen view showing a program of an analog BS channel with a message notifying that the same program is serving in a digital BS channel in accordance with the sixteenth embodiment of the present invention;

FIG. 69 is a table showing channel link information used in the sixteenth embodiment of the present invention;

FIG. 70 is a block diagram showing the arrangement of a program information producing apparatus in accordance with the sixteenth embodiment of the present invention;

DESCRIPTION OF THE PREFERRED EMBODIMENTS

Preferable embodiments of the present invention will be explained in more detail with reference the attached drawings.

Digital Broadcast System

For broadcasting audio and video data, the digital satellite broadcasting services rely of the MPEG2 technique which broadcasts a transport stream (TS) including a plurality of multiplexed packets of audio and video data. Besides the audio and video packets, the transport stream (TS) includes program information (i.e., program information required for multiplexing the audio and video information formatted according to MPEG2 and DVB). The program information is described in the form of a section-type table.

Figure 73:
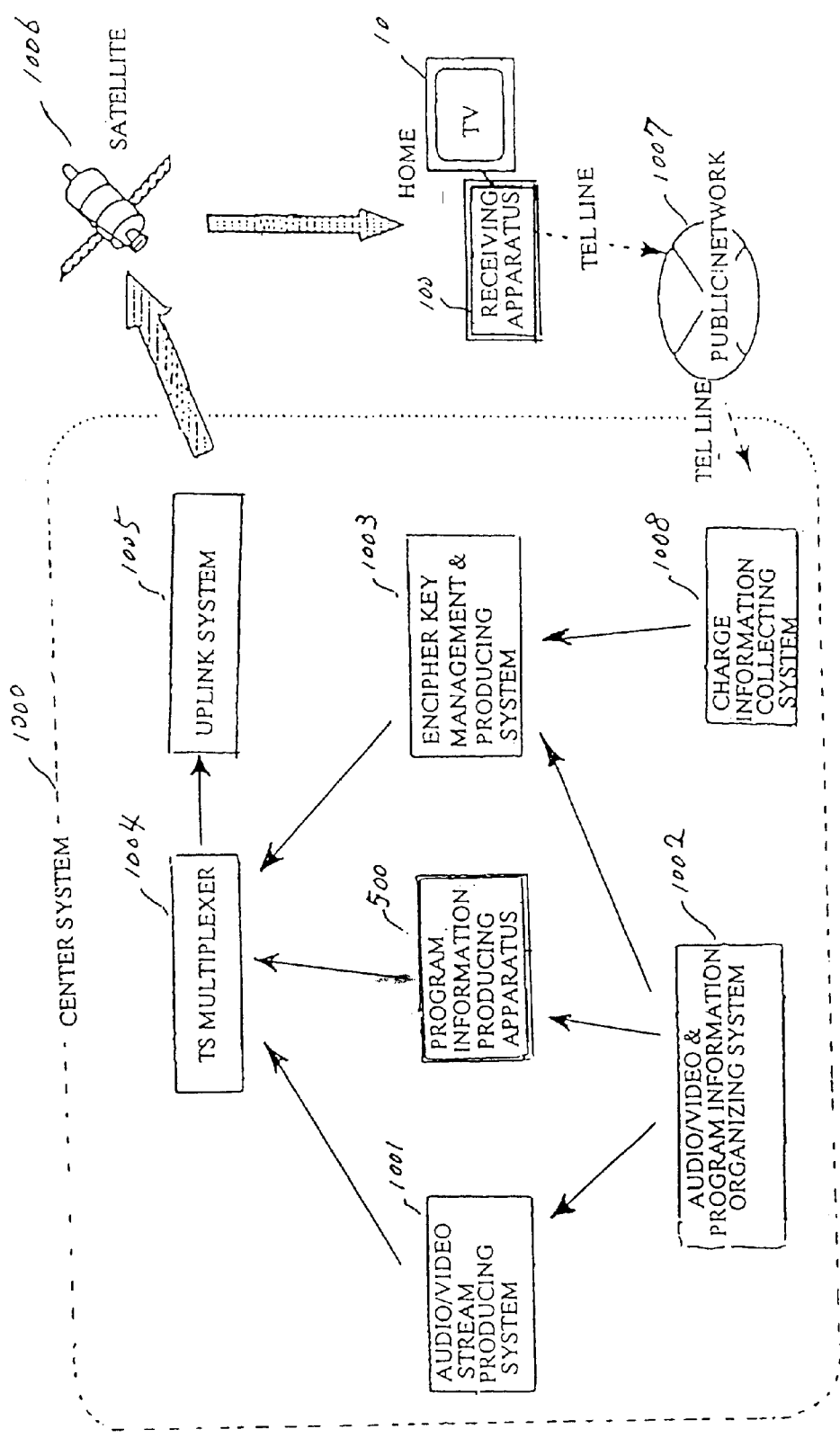
FIG. 73 is a block diagram showing a fundamental arrangement of a digital broadcast system.

FIG. 73 shows a digital broadcast system including a broadcast center system 1000. In FIG. 73, the broadcast center system 1000 comprises an audio/video stream producing system 1001, a program information producing apparatus 500, and an encipher key management and producing system 1003 which separately connected to a TS multiplexer 1004. An uplink system 1005 transmits a produced TS signal in the form of radio wave to a satellite 1006.

An audio/video and program information organizing system 1002 produces and stores program schedule information. The program information producing apparatus 500 receives the program schedule information from the audio/image and program information organizing system 1002, and produces program information (including program information used for multiplexing audio and video information and additional program information used for producing a program guide).

The audio and video data is sent from the audio/video stream producing system 1001 to the TS multiplexer 1004 in accordance with the program schedule information stored in the audio/video and program information organizing system 1002. The produced program information is multiplexed with the audio and video data in the TS multiplexer 1004. The multiplexed signal is sent to the uplink system 1005 and received via the satellite 1006 by each home receiving apparatus 100 associated with a TV monitor 10.

When the receiving apparatus 100 receives a PPV (pay per view) program, charge information is sent via a public network 1007 to a charge information collecting system 1008 of the broadcast center system 1000. The encipher key management and producing system 1003 allows the viewing of the requested PPV program upon confirming the procedure in the charge information collecting system 1008.

Hereinafter, preferable embodiments of the present invention will be explained with reference to attached drawings.

First Embodiment

A first embodiment of the present invention provides a system capable of searching programs according to user's preference, and producing and displaying a "my channel" consisting of programs fulfilling the search conditions (e.g., fee) given from the user.

Figure 1:
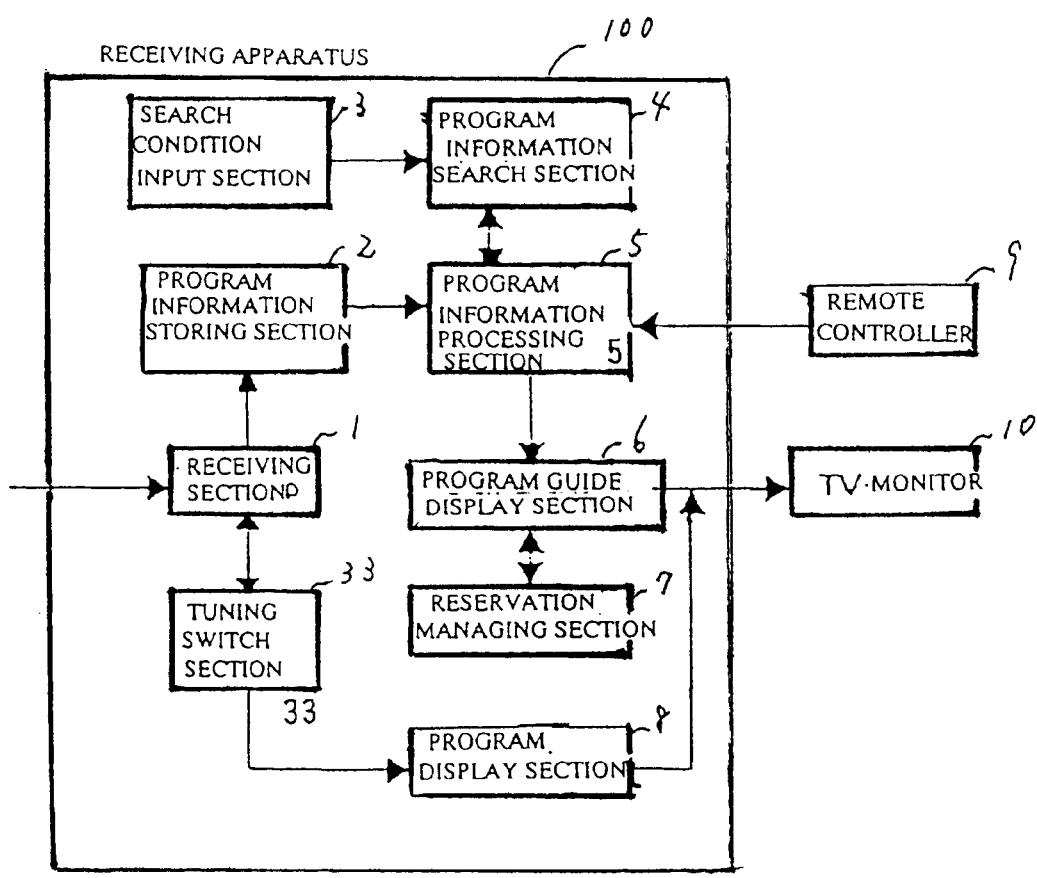
FIG. 1 is a schematic block diagram showing the arrangement of a receiving apparatus in accordance with a first embodiment of the present invention.

FIG. 1 shows a receiving apparatus 100 including a receiving section 1 which receives program information shown in the upper part of FIG. 3. The received program information is sent to a program information storing section 2. A search condition input section 3 gives a search condition, such as "a program fee is not higher than 100 yen." A program information processing section 5 receives the program information from the program information storing section 2. A program information search section 4 searches the program information in the program information processing section 5 and selects programs fulfilling the search condition given from the search condition input section 3. Thus, as a result of the performed search, the program information search section 4 produces personalized program information comprising the selected programs fulfilling the given search condition.

Figure 2:
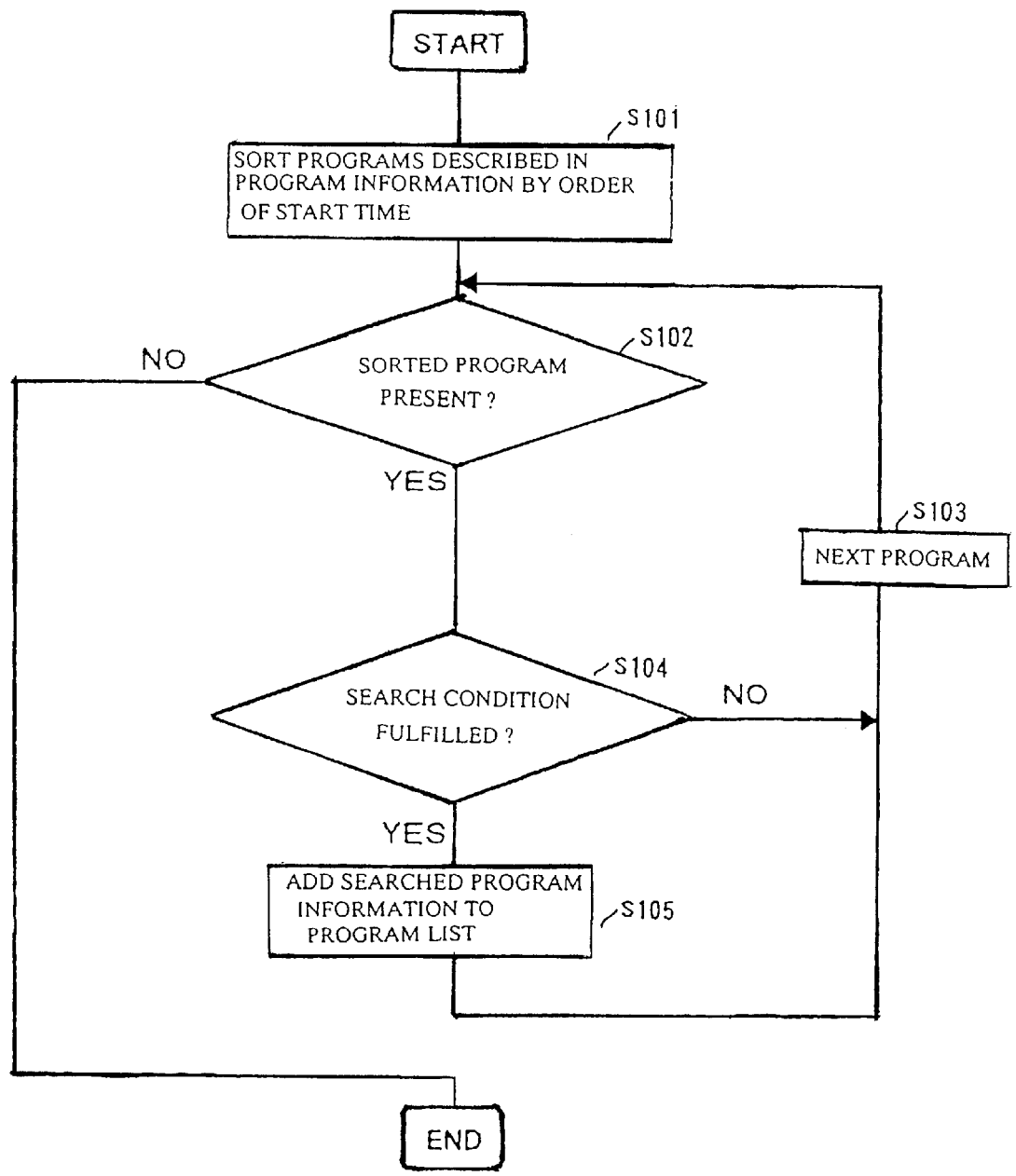
FIG. 2 is a flowchart showing the algorithm of program search processing and program information producing processing performed based on the search result in accordance with the first embodiment of the present invention.

FIG. 2 shows the algorithm of the program search processing and the program information producing processing performed based on the search result in accordance with the first embodiment. More specifically, all programs described in the program information are sorted by order of start time (in step S101). Then, it is checked whether the sorted program is present or not (in step S102). When no sorted program is present (NO), this routine ends. When any sorted program is present (YES), it is then checked whether the given search condition is fulfilled or not (in step S104). When the search condition is not fulfilled (NO), the processing of the next program is started (in step S103) and the processing of the step S102 is performed again. When the search condition is fulfilled (YES), the information of the sorted program is added to a program list of the searched program information (in step S105). Then, the processing of the next program is started (in steps S103 and S102) as described above. When no sorted program remains, this routine ends.

Through the above-described program search processing, the program information search section 4 produces the program information comprising the programs fulfilling the given search condition, as shown in the lower part of FIG. 3. FIG. 4 is a program guide displayed through a program guide display section 6. For example, a "my channel" shown in FIG. 4 comprises a program ① (having a program number 101 selected from the service channel "Nihon Maru" shown in the upper part of FIG. 3), a program ⑤ (having a program number 202 selected from the service channel "Fuji Sun" ), and other programs starting after 15:00 which are selected in the same manner from the received service channels. The "my channel", including the personalized program information resulting from the search processing, is displayed in the lower part of FIG. 3. In other words, the "my channel" is a user's personal channel not described in the program information received by the receiving section 1. The obtained "my channel" constitutes one channel of the program guide shown in FIG. 4.

When the viewer selects the "my channel" from the program guide, a tuning switch section 33 tunes in to a presently broadcasted program of the "my channel." A program display section 8 displays the program. For example, it is assumed that the "my channel" is selected at 13:00. According to the program guide shown in FIG. 4, the tuning switch section 33 immediately tunes in to the program ① of the service channel "Nihon Maru", and subsequently at 14:00 tunes in to program ⑤ of the service channel "Fuji Sun."

In the algorithm of the program information search, the search is performed only for the programs whose start times are equal to or later than the end time of the program added to the list of the searched program information. For example, when a program ending at 14:00 is added to the list of the searched program information, no search is performed for all of programs having start times earlier than 14:00 and the search is performed for the programs having start times equal to or later than 14:00.

Figure 5:
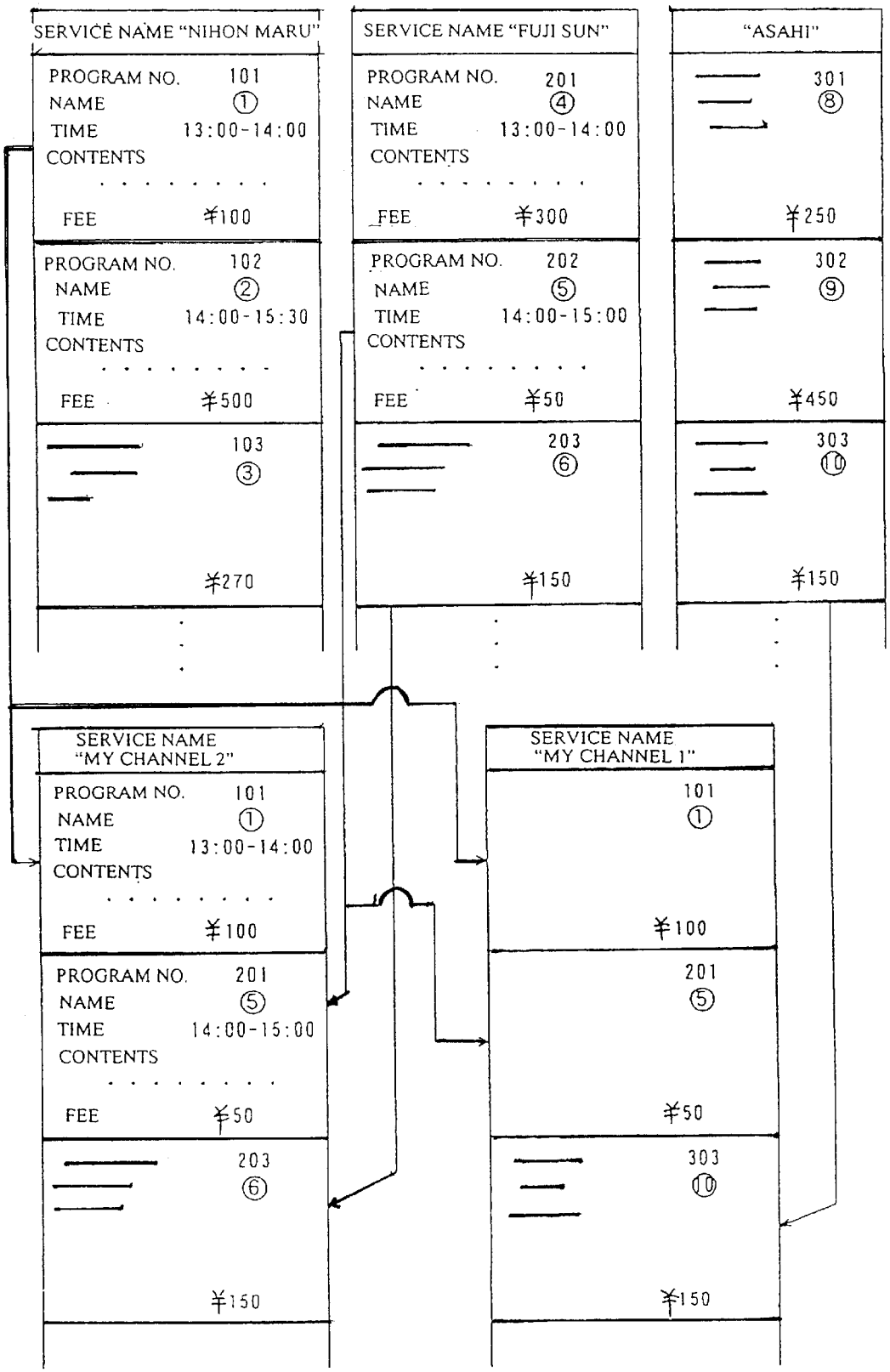
FIG. 5 is a view showing program information of my channels 1 and 2 resulting from the search in accordance with the first embodiment of the present invention.

Furthermore, when the program information shown in the upper part of FIG. 5 is received, a search condition "a program fee is not higher than 150 yen" may be entered. In this case, the program information shown in the lower part of FIG. 5 is produced as personalized program information resulting from the search. The resultant program information is displayed through the program guide display section 6, as shown in FIG. 6. In this case, the program guide displays two channels of "my channel 1"and "my channel 2"because a total of two programs are scheduled in the same time slot from 15:00 to 16:00. The "my channel 1"includes a program ⑩ of the service channel "Asahi", while the "my channel 2"includes a program ⑥ of the service channel "Fuji Sun."

According to the tables shown in FIGS. 4 and 6, the user's personal "my channel" is an independent channel. However, as shown in FIG. 9, it is possible to display the "my channel" consisting of the selected programs using colors or fonts discriminable from non-selected programs.

Furthermore, the above-described search condition relates to the program fee. It is however possible to use a search condition relating to other factor, such as program genre, viewer's residence, sex, age or the like. It is also possible to use other search conditions occasionally entered from the viewer or adequately judged from viewing history.

It is also preferable to use a program guide shown in FIG. 10, according to which the fee for each PPV program is displayed and a total fee (i.e., a sum amount of charging fees) is displayed separately. Regarding the display for the total fee, it will be possible to use various graphic techniques, such as a bar graph or a color display.

As apparent from the foregoing description, the first embodiment of the present invention makes it possible to display a program guide including a personal channel consisting of the programs selected according to the search condition given from the viewer. This arrangement is helpful for the viewers in selecting favorable programs from numerous programs receivable by his/her receiving apparatus. Furthermore, as an independent channel is assigned to the searched programs, the viewers can continuously watch the favorable programs without changing the channel. Providing the display of program fees is effective to facilitate the program selection. Thus, the first embodiment of the present invention improves the conspicuousness of the program guide.

Second Embodiment

A second embodiment differs from the first embodiment in that, when the viewer selects any program not included in the list of the searched programs, the search is performed again so as to include the designated program.

Figure 7:
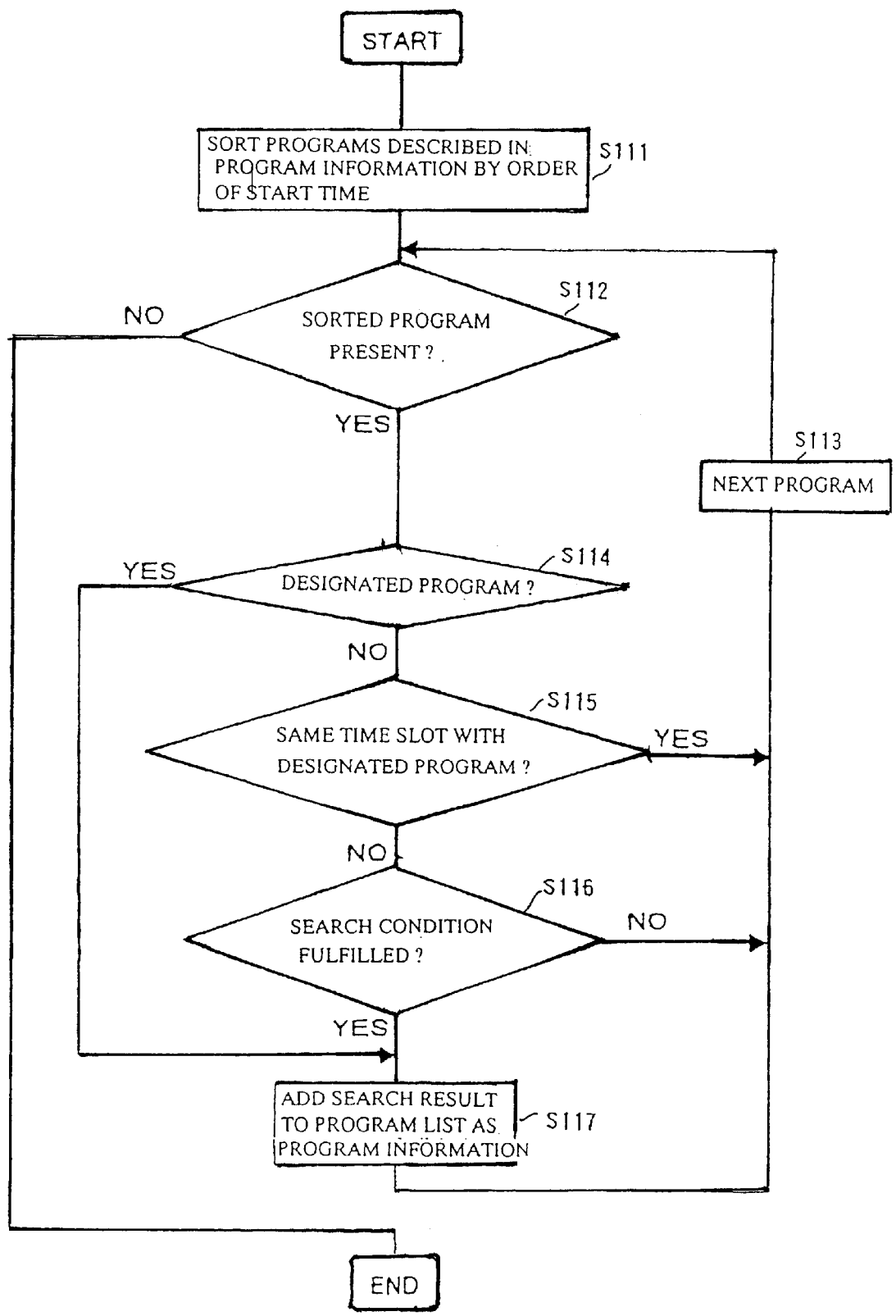
FIG. 7 is a flowchart showing the algorithm of program search processing and program information producing processing performed based on the search result in accordance with a second embodiment of the present invention.

It is assumed that, when the program guide of FIG. 4 is displayed, the viewer manipulates a remote controller 9 to change the "my channel" so as to include a program 11 of the service channel "Asahi." in response this request, the program information search section 4 performs the search according to the algorithm shown in FIG. 7. More specifically, all programs described in the program information are sorted by order of start time (in step S111). Then, it is checked whether the sorted program is present or not (in step S112). When no sorted program is present (NO), this routine ends. When any sorted program is present (YES), it is then checked whether the sorted program is the designated program or not (in step S114).When the sorted program is the designated program (YES), the information of the sorted program is added to a program list of the searched program information (in step S117). Then, the processing of the next program is started (in steps S113). Then, the processing of the step S112 is performed again. When the sorted program is not the designated program (YES), it is then checked whether the sorted program and the designated program are in the same time slot or not (in step S115). When the sorted program and the designated program are overlapped (YES), the flow of this control routine proceeds to the step S113 and then returns to the step S112. When the sorted program and the designated program are not overlapped (NO), it is then checked whether the given search condition is fulfilled or not (in step S116). When the search condition is not fulfilled (NO), the processing of the next program is started (in step S113) and the processing of the step S112 is performed again. When the search condition is fulfilled (YES), the information of the sorted program is added to the program list of the searched program information (in step S117). Then, the processing of the next program is started (in steps S113 and S112) as described above. When no sorted program remains, this routine ends.

As a result, the program guide display section 6 displays a program guide shown in FIG. 8 which differs from the program guide shown in FIG. 4 in that the "my channel" includes the program 11 of the service channel "Asahi" in the time slot from 16:00 to 17:00. In other words, the program ⑦ is replaced by the program 11.

As apparent from the foregoing description, the second embodiment of the present invention allows the viewer to modify the program guide through a manual operation when the program guide does not include any favorable program. Thus, it becomes possible to reschedule the personal channel.

Third Embodiment

A third embodiment of the present invention provides a system which is responsive to viewer's selection of a time shift program and performs the scheduling so as to mandatorily include the designated time shift program. When there are a plurality of patterns, display of these patterns is performed by order of fee.

The "time shift program" is generally referred to as a program repetitively broadcasted in different time slots. According to the third embodiment, the viewer selects a favorite program from a time shift program list shown in FIG. 11. In this case, each time shift program has a fee variable according to the broadcasting time. For example, the viewer may select a program "guide to C++" as a favorite time shift program. When the viewer selects a "start scheduling" key displayed on the screen, the program information search section 4 shown in FIG. 1 performs the scheduling and produces the searched program information (FIG. 14). The program guide display section 6 displays a program guide shown in FIG. 12, highlighting the search programs corresponding to the search ID=1 shown in FIG. 14. The total fee for the selected programs is 800 yen. When the viewer selects a "next route" key displayed on the screen, the program guide display section 6 displays another program guide shown in FIG. 13, highlighting the search programs corresponding to the search ID=2 shown in FIG. 14. Both of the program guides shown in FIGS. 12 and 13 include the program "guide to C++", but the latter is more expensive in the fee than the former. When there are three or more candidates, the similar operation is repeated. Thus, the viewer can make a reservation of viewing or recording by checking the contents of the plurality of routes.

It is possible to select a plurality of programs, although only one program is selected in FIG. 11. In this case, the program information search section 4 shown in FIG. 1 performs the scheduling so as to include all of the designated programs. If it is impossible to include all of the designated programs, a message display informs the viewer of failure of the scheduling. The message may include a statement that the scheduling is feasible upon reducing the number of programs.

Although the above-described embodiments discloses the receiving apparatus having the receiving section for receiving the program information, it is possible to use other media, such as FD and DVD, for storing and transmitting the program information, or it may be possible to use a terminal having the capability of storing the same.

In the explanation of the above-described embodiments, operation of the broadcast center is omitted. However, it should be understood that the program information is produced from the program schedule information sent from the audio/video and program information organizing system 1002 shown in FIG. 73. If the audio/video and program information organizing system is not provided, it will be possible to produce the program information from the program schedule information in the program information producing apparatus.

In the display of both program guides shown in FIGS. 12 and 13, the selected programs are highlighted by changing the color. However, it is possible to provide an independent channel in the same manner as that of the first and second embodiments.

As described in the foregoing description, the third embodiment of the present invention allows the viewers to select a preferable program schedule among a plurality of routes considering the charging fee or viewer's personal schedule, for example, when the viewer has preferable programs in mind but has not yet fixed the schedule. Thus, it becomes possible to reduce the burden of the viewers in the selection of programs.

Fourth Embodiment

FIG. 26 is a block diagram schematically showing the arrangement of a program information producing apparatus 500 in accordance with a fourth embodiment of the present invention. The program information producing apparatus 500 comprises an advertisement information producing section 53 which produces a packet ID (PID) of each elementary stream (ES) of advertisement audio and video data to be involved in the program. FIG. 15 shows the program information including the packet IDs of the advertisement elementary streams. In other words, an advertisement stream data base 54 sends out the audio and video data of the advertisement stream in the form of PID described in the program information.

Figure 27:
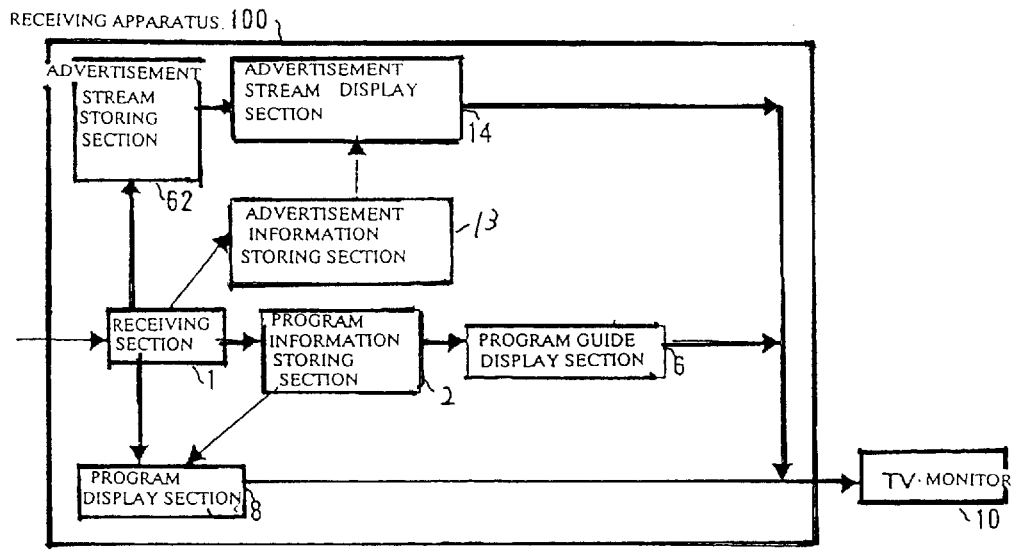
FIG. 27 is a block diagram showing the arrangement of a receiving apparatus in accordance with the fourth embodiment of the present invention.

A receiving apparatus 100 shown in FIG. 27 refers to the program information and does not decode advertisement streams even when the selected channel agrees with viewer's preference. More specifically, the program display section 8 decodes only the audio and video data of ordinary programs other than the advertisement streams, and displays the decoded video with sounds through a TV monitor 10. FIG. 16 shows the screen of TV monitor 10 only displaying the elementary streams of packet IDs 122 and 455 in accordance with the program information shown in FIG. 15. However, decoding the audio and video data of the advertisement streams of packet IDs 200 and 788 is feasible in response to the request of the viewer. FIG. 17 shows a program guide with a portion "A" displaying the advertisement data. Besides the audio and video data, it is possible to provide an advertisement steam of text data (as indicated by packet ID 199 in FIG. 15). It is possible to provide a "CM information" key displayed as part of the program guide so as to allow the viewer to display sponsor's statement "C" on the screen. Other data preferably broadcasted in the form of the advertisement stream are still video, sponsor's logo, URL of Internet home page, and sponsor name. In this case, it is possible to provide button keys on the displayed program guide so as to allow the viewer to selectively display the necessary information according to viewer's preference.

Although this embodiment discloses the program information producing apparatus describing the advertisement streams discriminable in the program information, it is possible to describe the type of the elementary stream in event information.

It is also preferable that the program information producing apparatus defines numerous advertisement streams, e.g., a plurality of streams for each of audio and video data, and the program display section 8 selects a preferable stream according to the viewer's residence, age and program type (data broadcast, HDTV, SDTV etc.) in the receiving apparatus 100 shown in FIG. 27.

It is preferable that the advertisement stream storing section 62 stores the advertisement streams received by the receiving section 1. It is also preferable to use other media, such as FD and DVD, to store and transmit the advertisement data. It is also preferable that a predetermined number of advertisement streams are prepared beforehand in the receiving apparatus.

With the above-described arrangement, it becomes possible to display the sponsor's statement or CM together with the program guide on the screen of the TV monitor 10. If the viewer requests the display of program guide during the broadcasting of CM, the displayed program guide will overlap with the CM at least in part. This embodiment eliminates such sponsor's worries.

This is advantageous for the broadcasters when sponsor fees are chief income.

Fifth Embodiment

According to a fifth embodiment of the present invention, the receiving apparatus 100 has the program guide display section 6 and the program display section 8 cooperatively capable of reducing the size of the program video in response to a viewer's request and displaying the program guide in a newly given space on the screen.

This embodiment allows the viewer to watch the program guide without interrupting the viewing of the program. In other words, displaying the program guide does not substantially reduce the viewer's chance of watching advertisements. This is preferable for the broadcasters and sponsors because their advertisement activities are not disturbed by the viewer's selection of the program guide.

Sixth Embodiment

Figure 28:
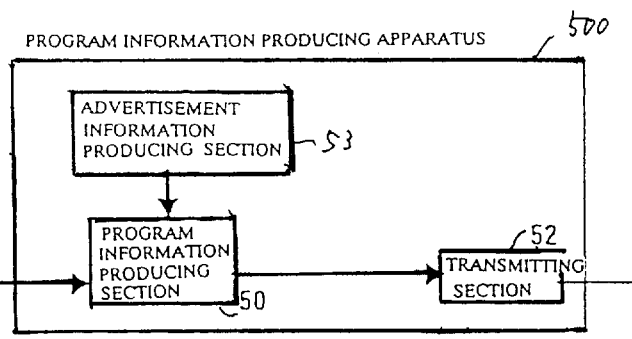
FIG. 28 is a block diagram showing the arrangement of a program information producing apparatus in accordance with the sixth embodiment of the present invention.
Figure 29:
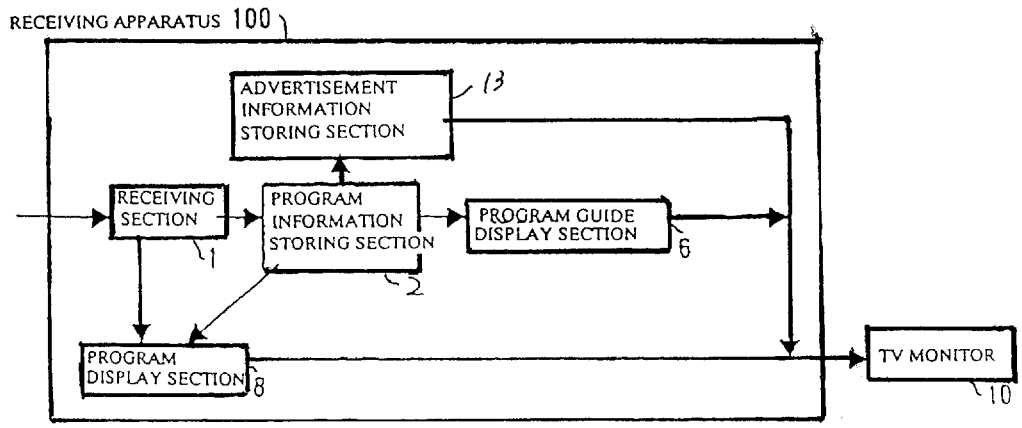
FIG. 29 is a block diagram showing the arrangement of a receiving apparatus in accordance with the sixth embodiment of the present invention

FIG. 28 is a block diagram showing the arrangement of a program information producing apparatus 500 in accordance with a sixth embodiment of the present invention. The program information producing apparatus 500 comprises an advertisement information producing section 53 which produces the program information including advertisement information, such as sponsor ID and sponsor name, as shown in FIG. 20. FIG. 29 is a block diagram showing the arrangement of a receiving apparatus 100. A program information storing section 2 sends only advertisement information to an advertisement information storing section 13. FIG. 22 shows a program guide including both of program names and sponsor names, displayed on the screen of a TV monitor 10. For example, a sponsor name "Umeshita Electric" and a program name "Alarm clock TV!" are displayed in the same program frame of the channel 30.

Although only one sponsor name is displayed for each program, it is possible to display a plurality of sponsor names for each program. The sponsor information may include sponsor residence, telephone number, URL of Internet home address, sponsor logo data.

Although the sponsor name and related program name are paired in the same frame of the program guide shown in FIG. 22, it is possible to display video or text data in a predetermined region of the program guide so as to correspond to a related program. Furthermore, it is possible to display animated program.

The sponsor information may include a service type. It is possible to display the service type together with the program name in the same program frame.

As described above, the sixth embodiment of the present invention makes it possible to provide the program guide capable of displaying a sponsor name paired with a program name. This is preferable in that displayed program guide does not substantially reduce the viewer's chance of watching sponsor name or sponsor information.

Seventh Embodiment

FIG. 21 shows sub programs, such as commercial (CM) and program preview, constituting dissected portions of a program. In the following explanation, a sub program of commercial (CM) will be explained.

Figure 30:
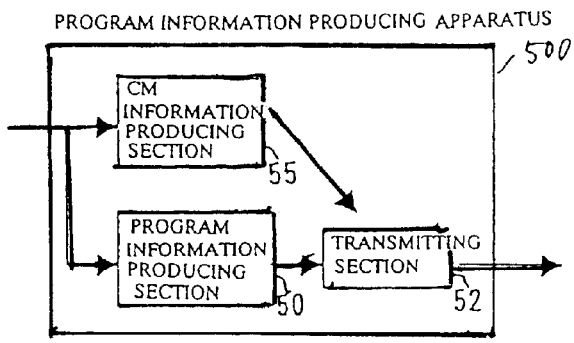
FIG. 30 is a block diagram showing the arrangement of a program information producing apparatus in accordance with the seventh embodiment of the present invention.

FIG. 30 is a block diagram showing the arrangement of a program information producing apparatus 500 including a program information producing section 50 producing program information and a CM information producing section 55 producing CM information. FIG. 23 shows an example (i.e., event information) of the program information describing program names and broadcast times as well as CM reference information (i.e., CM_ID) involved in the CM information, produced by the program information producing apparatus 500 of the seventh embodiment. FIG. 24 shows an example of the CM information describing CM discriminating information (CM_ID) and CM positional information (broadcast time etc.).

Figure 31:
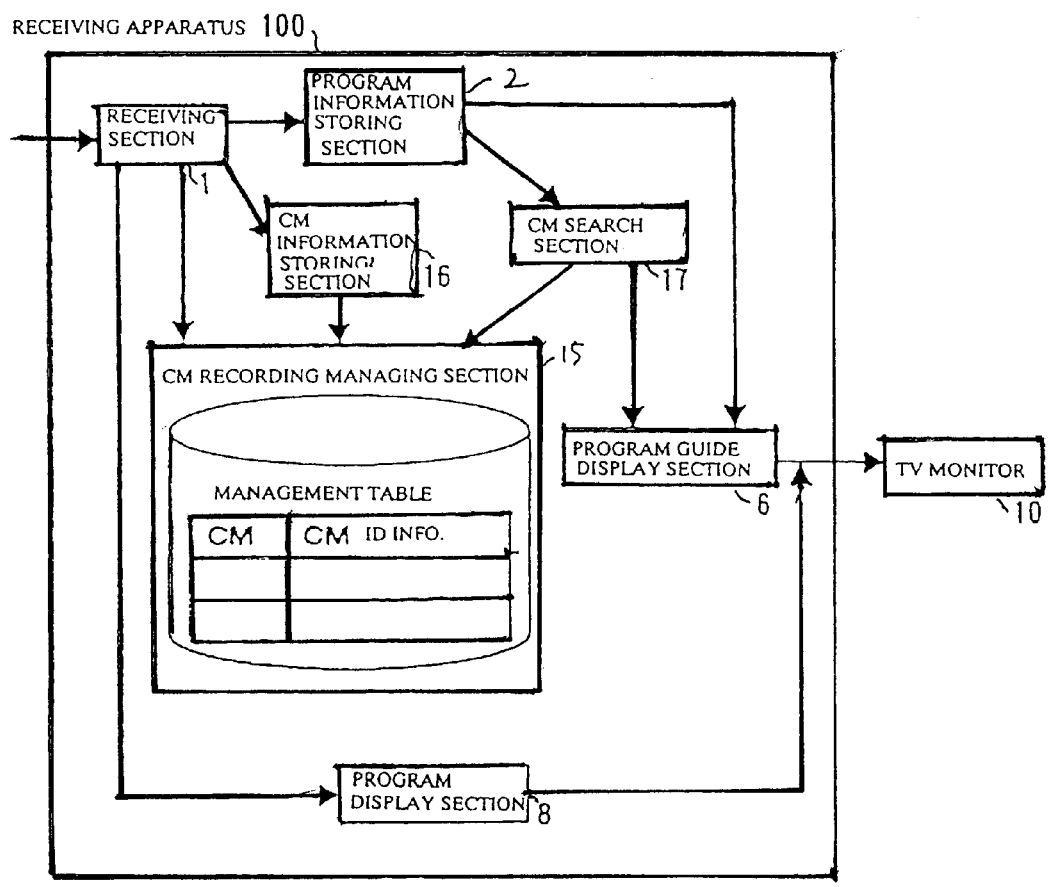
FIG. 31 is a block diagram showing the arrangement of a receiving apparatus in accordance with the seventh embodiment of the present invention.

FIG. 31 is a block diagram showing the arrangement of a receiving apparatus 100 including a receiving section 1 receiving the CM and related CM information and a CM information storing section 16 storing the received CM information. A CM recording managing section 15 uses a CM recording management table (refer to FIG. 25) to manage the CM and the related CM information and further to record (store) the CM. File IDs included in the CM recording management table (FIG. 25) are dependent on a filing system of the storing apparatus in the receiving apparatus 100. Each stored CM is reproducible in response to entry of the corresponding file ID.

When the viewer requests tuning in to a program, the receiving apparatus 100 decodes the audio and video data of the designated program in accordance with the program information. The decoded video is displayable with sounds through a TV monitor 10. It is assumed that the viewer requests the display of program guide when the TV monitor displays the program. In this case:

① A CM search section 17 obtains the CM reference information (CM_ID) of the presently display program from the program information stored in the program information storing section 2. For example, according to the program information shown in FIG. 23, the obtained CM_ID is 135 when the program "Alarm clock TV!" is displayed.

② The CM search section 17 accesses the CM recording management table managed by the CM recording managing section 15 to search or retrieve a CM having the same CM_ID. According to the CM recording management table shown in FIG. 25, the obtained information as a result of the search is a CM named "Goodby" having the CM_ID=135 and file ID=567.

③ The program guide display section 6 provides a space for displaying the CM searched through the procedure ② on the same scree as the program guide (refer to "A" in FIG. 17). Sounds may be produced together with the video of the CM. The display pattern shown in FIG. 17 can be replaced by another display pattern shown in FIG. 18 which provides a "CM information" button displayable at a predetermined position on the screen of the program guide. The "CM information" button allows the viewer to get sponsor statement.

Although FIG. 24 shows the table of CM information, it is possible to use a code indicating that the CM is presently broadcasted. This code, constituting part of the audio and video data of the CM, can be broadcasted together with CM_ID (for example, by describing it in a user data region according to the standard of MPEG). It is preferable that the receiving apparatus receives such a code and performs the recording and management of the CM according to the received code. Although the CM reference information is used to refer to the CM included in the program, the CM reference information may include another CM not related to this program.

Although a program refers to only one CM in the above-described example, it is needless to say that the number of CMs for a program is not limited to only one.

Although the above-described example shows a program referring to a sub program, it is preferable that a program refers to other program. In other words, each CM can be defined as an independent program rather than part of a program. In this case, the program information includes both of programs and CMs described in the same manner but discriminable by their ID information.

According to the above-described fourth to seventh embodiments, the advertisement information or CM information are independent from or part of the program information. It is possible to transmit them separately, or as part of program information, from the program information producing apparatus. The receiving apparatus can operate appropriately in both cases. More specifically, when the receiving section receives the advertisement (or CM) information separately, the advertisement (or CM) information is directly sent to the advertisement (or CM) information storing section. When the receiving section receives the advertisement (or CM) information as part of the program information, the program information is once stored in the program information storing section. Then, the advertisement (or CM) information is sent from the program information storing section to the advertisement (or CM) information storing section.

Although the above-described examples disclose the advertisement (or CM) information, it is needless to say that the receiving apparatus can handle any other information relating to a program.

According to the above-described fourth to seventh embodiments, the receiving section of the receiving apparatus receives the program information, CM information and CM. However, it is possible to use other appropriate media, such as FD and DVD, for storing or transmitting the program information and others, or it may be possible to use a terminal having the capability of storing the same.

In the explanation of the above-described fourth to seventh embodiments, operation of the broadcast center is omitted. However, it should be understood that the program information is produced from the program schedule information sent from the audio/video and program information organizing system 1002 shown in FIG. 73. If the audio/video and program information organizing system is not provided, it will be possible to produce the program information from the program schedule information in the program information producing apparatus.

As apparent from the foregoing description, the seventh embodiment of the present invention substantially expands the applicability of CM by simply adding the CM information to the CM broadcasting system. The stored CM information is reusable when the program guide is displayed, increasing the chance of CM reproduction. This is basically acceptable for the sponsors. Thus, coexistence of the program guide and CM is appropriately realized.

Eighth Embodiment

Figure 43:
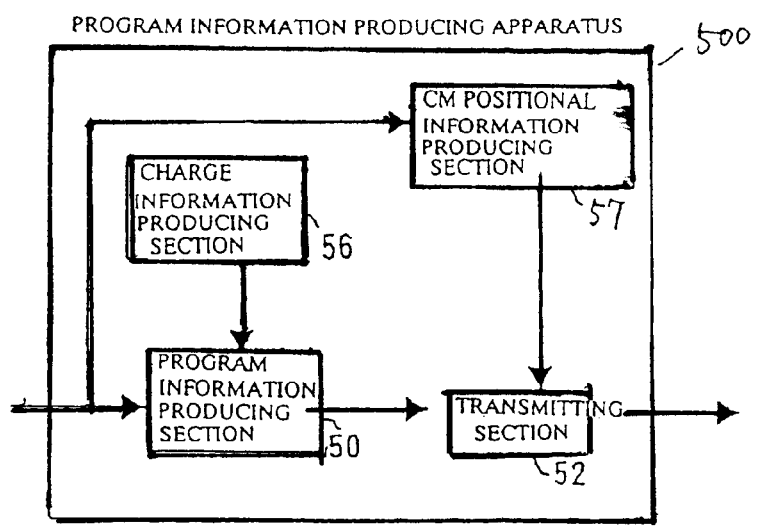
FIG. 43 is a block diagram showing the arrangement of a program information producing apparatus in accordance with the eighth embodiment of the present invention.

An eight embodiment is explained based on a system handling a sub program of commercial (CM) in the same manner as in the seventh embodiment. FIG. 43 is a block diagram showing the arrangement of a program information producing apparatus 500 in accordance with the eighth embodiment of the present invention. The program information producing apparatus 500 comprises a program information producing section 50 producing program information, a CM positional information producing section 57 producing CM positional information, and a transmitting section 52 transmitting both of the program information and the CM positional information produced from the program information producing section 50 and the CM positional information producing section 57. FIG. 32 shows an event information table including program name, broadcast time, recording fee (with or without CM skip), playback fee with CM fast forwarding and other fees for each program. A charge information producing section 56 produces the information relating to the fees. The produced charge information is added to the program information. The CM positional information includes broadcast time of each CM, as shown in FIG. 33.

Figure 44:
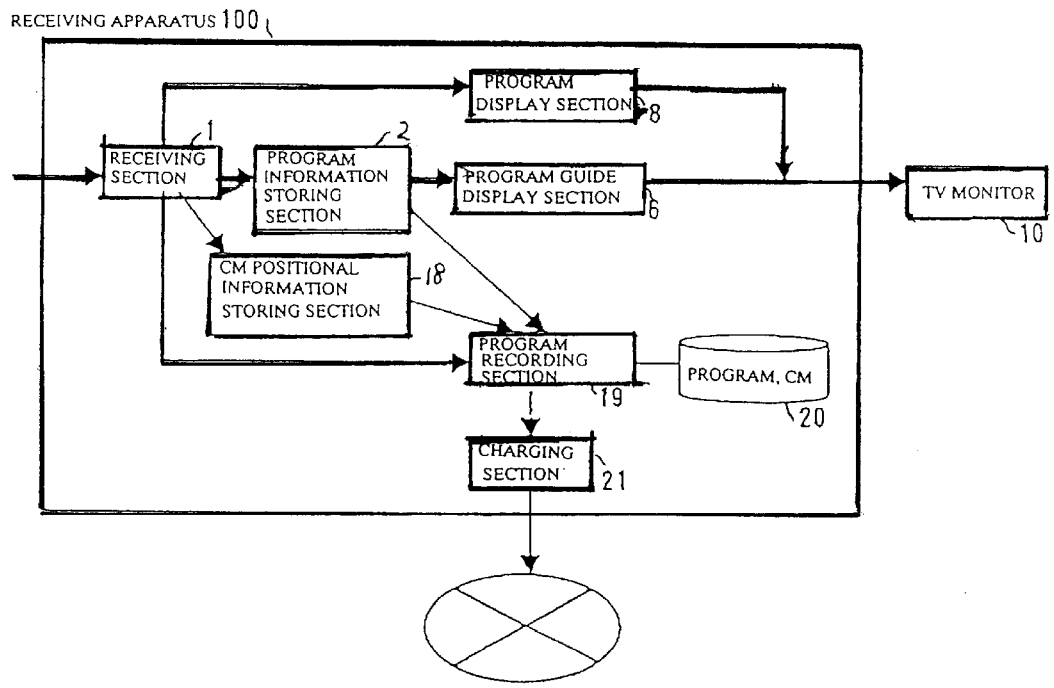
FIG. 44 is a block diagram showing the arrangement of a receiving apparatus in accordance with the eighth embodiment of the present invention.

FIG. 44 is a block diagram showing a receiving apparatus 100 in accordance with the eighth embodiment of the present invention. When an ordinary program is recorded, the receiving apparatus 100 operates in the following manner.

① A receiving, apparatus 1 receives the program information. A program information storing section 2 stores the received program information. A program guide display section 6 displays a program list for recording reservation with reference to the program information (refer to FIG. 34). The CM positional information received by the receiving section 1 is stored in a CM positional information storing section 18.

② The viewer makes a decision as to recording of the CM (refer to FIG. 35). According to the disclosed example, a recording reservation is made for the "Alarm clock TV!" program with associated CMs.

③ The receiving apparatus refers to the program information and the CM positional information. FIG. 33 shows a CM positional information table including the CMs having broadcast times scheduled in the time slot of the "Alarm clock TV!" program.

④ A program recording section 19 starts recording the program.

⑤ When the viewer selects the "recording with CM" in the procedure ②, the program recording section 19 records the CMs together with the "Alarm clock TV!" program.

When the viewer selects the "recording with no CM" in the procedure ②, the program recording section 19 skips the CMs with reference to the CM positional information to record only the "Alarm clock TV!" program.

⑥ A charging section 21 calculates a charge amount with reference to the selection of the viewer and recording fees described in the program information. Timing or method of the charging procedure may be different in each charging system adopted. According to the example disclosed in FIG. 35, the charging section 21 charges 20 yen according to the fees shown in FIG. 32 as the viewer selected the "recording with CM" of the "Alarm clock TV!" program.

Although FIG. 33 shows the table of CM positional information, it is possible to use a code indicating that the CM is presently broadcasted. This code can be broadcasted as part of the audio and video data of the CM (for example, by describing it in a user data region according to the standard of MPEG, in the case of digital broadcasting services). It is preferable that the receiving apparatus receives such a code and performs the recording and non-recording processing of the CM according to the received code.

As described in the foregoing description, the eighth embodiment sets a plurality of charge ranks according to the recording or viewing type of the CM. Thus, it becomes possible to set a variety of charge ranks according to advertisement activities of the broadcasters. For example, the fee for the recording with no CM is expensive because no advertisement income is expected. Furthermore, such a charge system will effectively prevent the viewers from cutting the CM thoughtlessly by utilizing the CM positional information.

Ninth Embodiment

Figure 45:
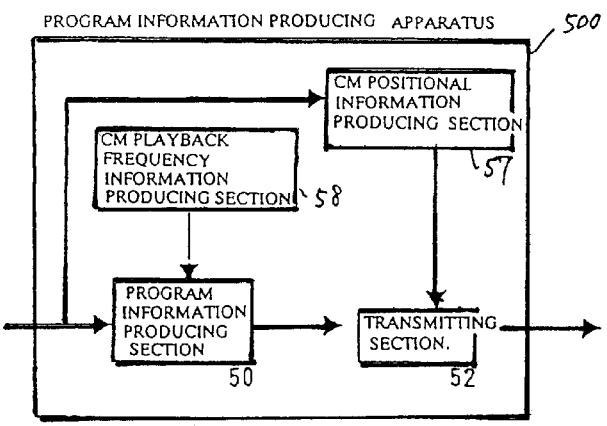
FIG. 45 is a block diagram showing the arrangement of a program information producing apparatus in accordance with the ninth embodiment of the present invention.

A ninth embodiment is explained based on a system handling a sub program of commercial (CM) in the same manner as in the seventh embodiment. FIG. 45 is a block diagram showing the arrangement of a program information producing apparatus 500 in accordance with the ninth embodiment of the present invention. The program information producing apparatus 500 comprises a program information producing section 50 producing program information, a CM positional information producing section 57 producing CM positional information, and a transmitting section 52 transmitting both of the program information and the CM positional information produced from the program information producing section 50 and the CM positional information producing section 57. FIG. 36 shows an event information table including program name, broadcast time, CM playback frequency and others. A CM playback frequency information producing section 58 produces the CM playback frequency. The produced CM playback frequency is added to the program information. As shown in FIG. 33, the CM positional information includes broadcast time of each CM.

Figure 46:
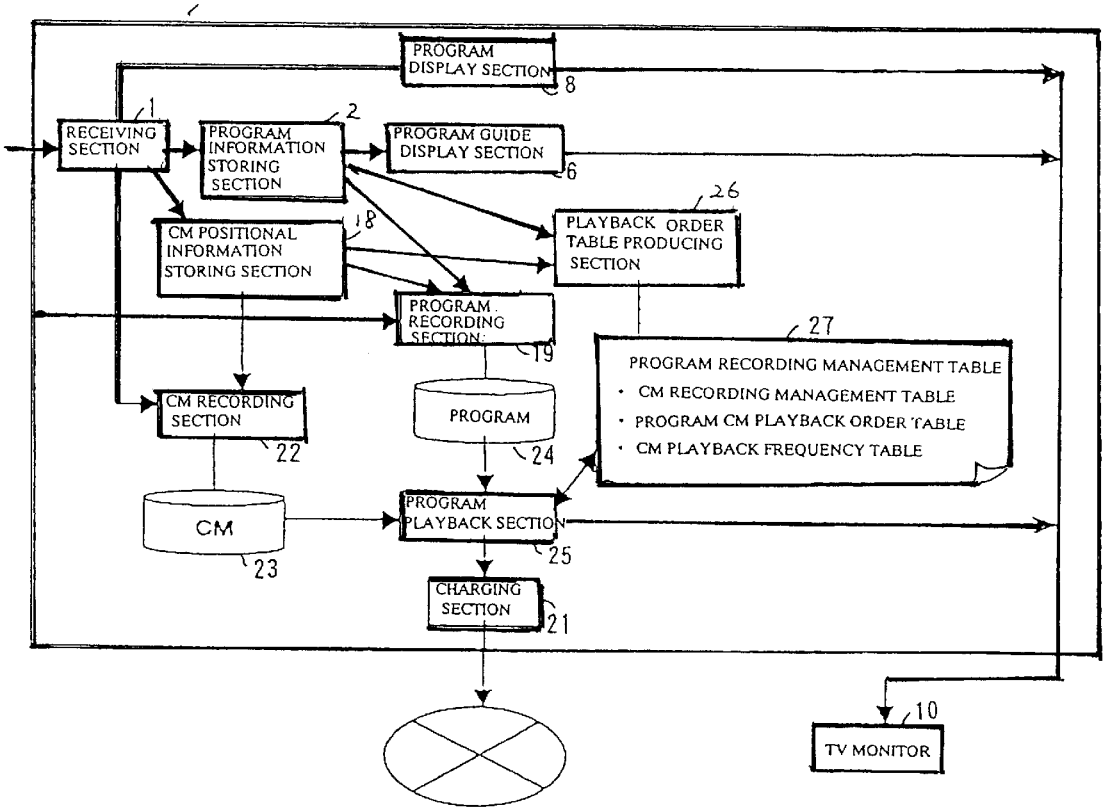
FIG. 46 is a block diagram showing the arrangement of a receiving apparatus in accordance with the ninth embodiment of the present invention.

FIG. 46 is a block diagram showing a receiving apparatus 100 in accordance with the ninth embodiment of the present invention. When the viewer requests the recording of the "Alarm clock TV!" program, the receiving apparatus 100 operates in the following manner.

① A program recording section 19 records the program described in the program information stored in a program information storing section 2. A CM recording section 22 records a CM described in the CM positional information stored in a CM positional information storing section 18.

② Meanwhile, a playback order table producing section 26 produces a program recording management table (FIG. 37), a CM recording management table (FIG. 38), as well as a program CM playback order table (FIG. 39) and a CM playback frequency table (FIG. 40). The method of allocating a recording program file ID shown in the program recording management table (FIG. 37) and a recording CM file ID shown in the CM recording management table (FIG. 38) are dependent on the filing system of the storing apparatus in the receiving apparatus 100. Each stored program or CM is reproducible in response to entry of the corresponding file ID. The mandatory playback frequency shown in the CM playback frequency table (FIG. 40) agrees with the mandatory CM playback frequency described in the program information (FIG. 36).

③ A program playback section 25 reproduces recorded programs and CMs in accordance with an order described in the program CM playback order table (FIG. 39). In the CM playback frequency table (FIG. 40), the present playback frequency is incremented in response to each playback operation of the program, with an initial number 0 given when the table is produced. When the present playback frequency becomes identical with the mandatory playback frequency, the CM is no longer reproduced (i.e., skipped) during the playback of the program.

Although the above-described embodiment uses the table including the CM positional information, it is possible to use a code indicating that the CM is presently broadcasted. This code can be broadcasted as part of the audio and video data of the CM (for example, by describing it in a user data region according to the standard of MPEG, in the case of digital broadcasting services). It is preferable that the receiving apparatus receives such a code and performs the recording and non-recording processing of the CM according to the received code.

According to the above-described embodiment, the program information producing apparatus produces the program information including the mandatory CM playback frequency. However, the mandatory CM playback frequency may be a predetermined value which may be directly input into the receiving apparatus.

As described in the foregoing description, this embodiment surely performs the playback of the CM predetermined times. Thus, the broadcasters can provide the guaranteed CM playback system for each sponsor.

Tenth Embodiment

A tenth embodiment is explained based on a system handling a sub program of commercial (CM) in the same manner as in the ninth embodiment. The program information producing apparatus 500 of the ninth embodiment is directly applicable to the tenth embodiment.

Figure 47:
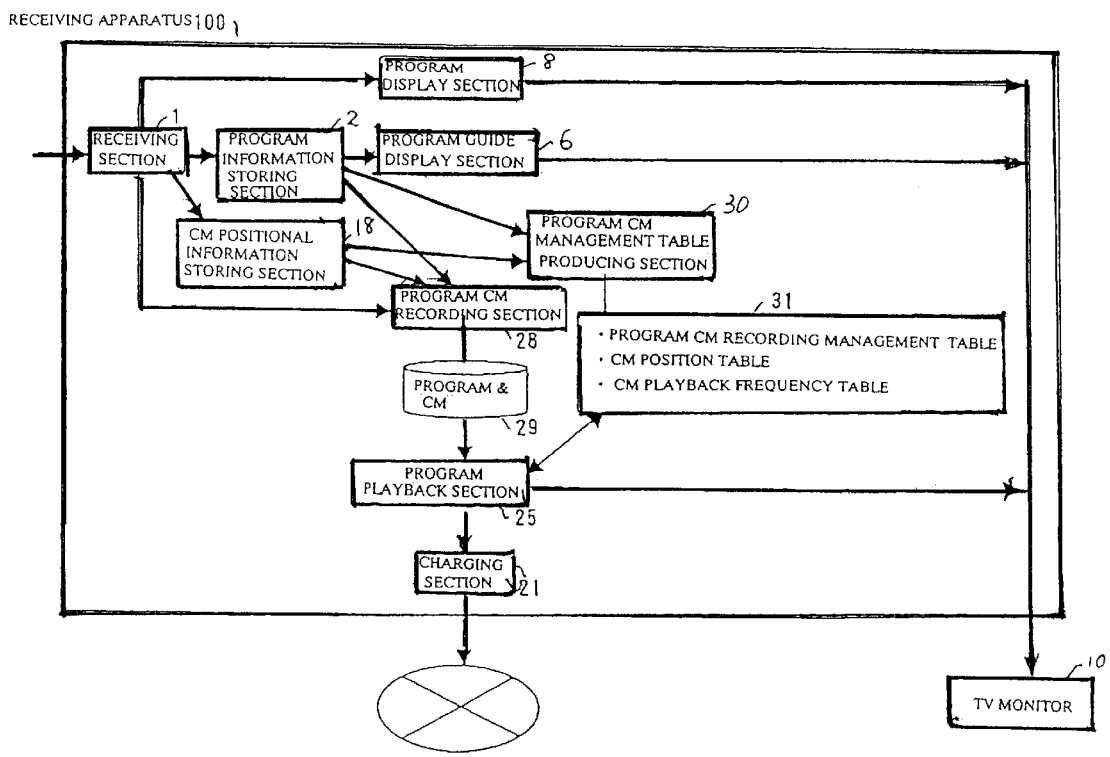
FIG. 47 is a block diagram showing the arrangement of a receiving apparatus in accordance with the tenth embodiment of the present invention.

FIG. 47 is a block diagram showing a receiving apparatus 100 in accordance with the tenth embodiment of the present invention. The receiving apparatus 100 operates in the following manner.

① A program CM recording section 28 records a program described in the program information stored in a program information storing section 2 (as one stream).

② In the same manner as the procedure ①, a program CM management table producing section 30 produces a program CM recording management table (FIG. 42), a CM position table (FIG. 41) and a CM playback frequency table (FIG. 40) with reference to the CM positional information stored in the CM positional information storing section 18. In the tables, the meaning of file IDs and the mandatory playback frequency are defined in the same manner as in the ninth embodiment.

③ A program playback section 25 reproduces a recorded program with reference to the program CM recording management table (FIG. 42). In the CM playback frequency table (FIG. 40), the present playback frequency is incremented in response to each playback operation of the program, with an initial number 0 given when the table is produced. When the present playback frequency becomes identical with the mandatory playback frequency, the CM is no longer reproduced (i.e., skipped) with reference to the CM position table (FIG. 41) during the playback of the program.

When the program information includes "playback fee with CM fast forwarding", "viewing fee with CM", and "viewing fee with CM skip" as shown in FIG. 32. In the receiving apparatus 100 (FIG. 46) of the ninth embodiment and the receiving apparatus 100 (FIG. 47) of the tenth embodiment, the charging section 21 calculates a charge amount with reference to the viewing pattern.

According to the above-described eighth to tenth embodiments, the receiving section of the receiving apparatus receives the program information and CM positional information. However, it is possible to use other appropriate media, such as FD and DVD, for storing and transmitting the program information and others, or it may be possible to use a terminal having the capability of storing the same.

In the explanation of the above-described eighth to tenth embodiments, operation of the broadcast center is omitted. However, it should be understood that the program information is produced from the program schedule information sent from the audio/video and program information organizing system 1002 shown in FIG. 73. If the audio/video and program information organizing system is not provided, it will be possible to produce the program information from the program schedule information in the program information producing apparatus.

According to the above-described embodiment, the program information producing apparatus produces the program information including the mandatory CM playback frequency. However, the mandatory CM playback frequency may be a predetermined value which may be directly input into the receiving apparatus.

As described in the foregoing description, this embodiment surely performs the playback of the CM predetermined times. Thus, the broadcasters can provide the guaranteed CM playback system for each sponsor.

Eleventh Embodiment

FIG. 50 is a block diagram showing a program information producing apparatus 500 in accordance with the eleventh embodiment. The program information producing apparatus 500 comprises a message timing information producing section 59 which produces message timing information. The message timing information determines a timing according to which the receiving apparatus outputs a message about the next program. The produced message timing information is added to the next program information. A next program information producing section 60 produces next program information during the broadcasting of a present program. The next program information includes information about a program to be tuned in to during or after the broadcasting of the present program. The produced next program information is added to the program information. A program information producing section 50 produces a table of the next program information shown in FIG. 49 and sends it to a transmitting section 52. Regarding a method of multiplexing the transmitting data, the digital broadcasting services will realize a multiplexed data transmission by describing the data in a user data region according to the standard of MPEG or by utilizing a section-type table.

FIG. 51 is a block diagram showing a receiving apparatus 100 in accordance with the eleventh embodiment. The receiving apparatus 100 comprises a receiving section 1 which receives the next program information as well as the present program information during the display of the present program. A message output section 32 outputs a message shown in FIG. 48 on the screen of a TV monitor 10 during or after the broadcasting of the present program. This message is for asking whether the viewer selects the next program or continues watching the same program. When the viewer selects the next program, a tuning switch section 33 tunes in to the next program described in the next program information. A program display section 8 produces the audio and video data of the next program.

When the next program information includes a message timing as shown in FIG. 49, the message output section 32 outputs the message at the designated timing.

Adding the message timing to the next program information as shown in FIG. 49 is effective to control the display timing of the message so as not to overlap with important announcement or advertisement provided in the program.

Figure 48:
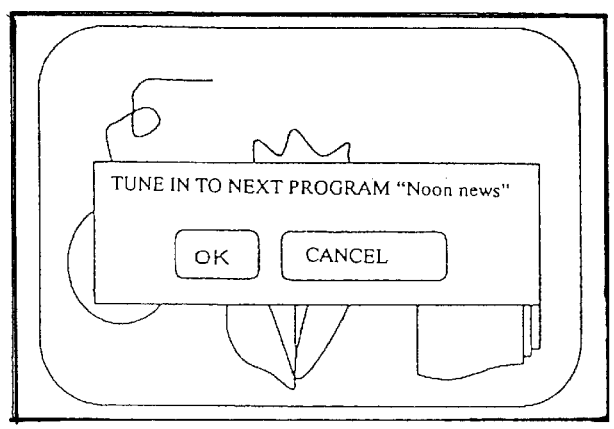
FIG. 48 is a screen view used for deciding the viewing of the next program in accordance with an eleventh embodiment of the present invention.

Although the example shown in FIG. 48 shows only one program, it is possible to display a plurality of next programs. In this case, the screen display of FIG. 48 will be slightly modified to allow the viewer to select a favorite program among the plurality of programs.

Describing the next program information is effective for the broadcasters selectively using a plurality of channels for broadcasting a same program, such as a highschool baseball telecast. For example, the next program information can be effectively used when the program is switched from the present channel to other channel due to organizing reasons of the programs, or when the broadcaster asks viewers to transfer to the other channel upon completion of the scheduled broadcast time in the present channel.

The present digital broadcast services generally define theoretical channels to let the viewers watch the same channel continuously. In the display of program guide, the program guide generally includes a plurality of channels, each channel including a plurality of time slots. However, if the concept of such channels is eliminated, or when the number of programs simultaneously broadcasted is varied, it will be difficult for the viewers to smoothly select a next program after finishing the viewing of the present program. In other words, it will be difficult for the receiving apparatus to appropriately tune in to the next program. However, the above-described eleventh embodiment solves these problems by providing the next program information. Thus, the viewer can smoothly select the next program. The receiving apparatus will have no dead time during which no channel is tuned.

The above-described eleventh embodiment can be applied to an emergency broadcasting. Although it may be possible to use network information describing reference information for an emergency broadcasting program, the eleventh embodiment makes it possible to set the reference information for the emergency broadcasting for each program. Thus, for the broadcasters who utilize no network information, it becomes possible to perform the emergency broadcasting based on their own judgement.

The above-described eleventh embodiment uses a screen display for letting the viewers know the message that the next program information is added to the program information. However, in the playback of a recorded program, such a message may not be displayed to perform the automatic tuning in to the next program. Alternatively, it may be possible to arrange the setting to ask the viewers as to whether they accept the automatic tuning function or not.

According to the above-described eleventh embodiment, the receiving section of the receiving apparatus receives the program information. However, it is possible to use other appropriate media, such as FD and DVD, for storing and transmitting the program information, or it may be possible to use a terminal having the capability of storing the same.

In the explanation of the above-described eleventh embodiment, operation of the broadcast center is omitted. However, it should be understood that the program information is produced from the program schedule information sent from the audio/video and program information organizing system 1002 shown in FIG. 73. If the audio/video and program information organizing system is not provided, it will be possible to produce the program information from the program schedule information in the program information producing apparatus.

Twelfth Embodiment

Figures 63, 64:
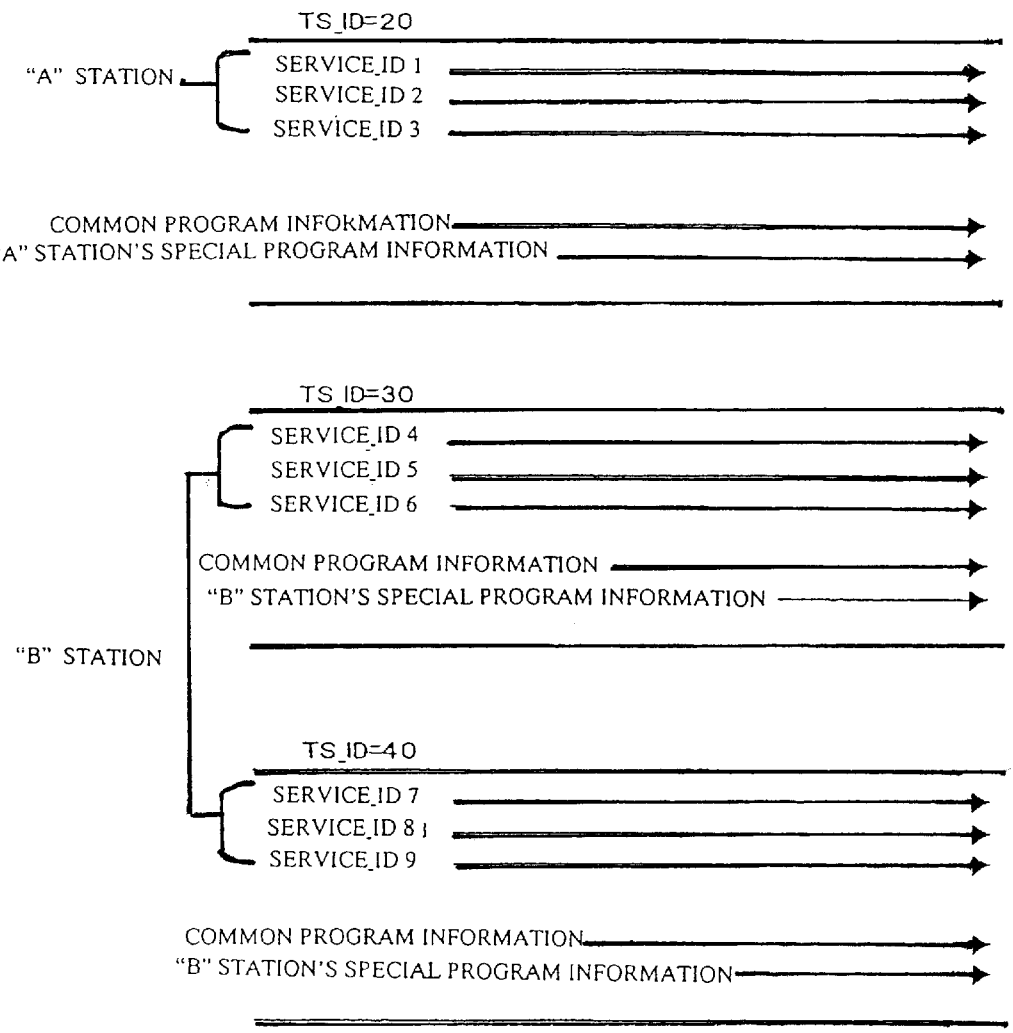
FIG. 63 is tables showing channel information, serving as part of the uncommon program information, used in the twelfth embodiment of the present invention.
FIG. 64 is a view showing service transmitting condition of each TS (transport stream) transmitted from "A" and "B" stations in accordance with the twelfth embodiment of the present invention.

A twelfth embodiment provides a program guide whose content is variable in accordance with viewer's selection of a channel. FIG. 52 is a block diagram showing the arrangement of a program information producing apparatus 500 in accordance with the twelfth embodiment of the present invention. The program information producing apparatus 500 comprises a program information producing section 50 produces common program information for all of broadcasters as well as uncommon program information relating to exclusive channels provided by individual broadcasters. The produced program information is sent to a transmitting section 52. The common program information includes a table including overall data of the network (FIG. 60) or a table indicating the correlation between a broadcaster and channels (FIG. 61). The common program information is included in every TS (transport stream) signal. The uncommon program information includes a program broadcast schedule of each channel (FIG. 62) or channel information (FIG. 63). The uncommon program information is included in only the TS signal of a service channel of a related broadcaster (FIG. 64).

FIG. 53 is a receiving apparatus 100 in accordance with the twelfth embodiment of the present invention. The receiving apparatus 100 comprises a program information processing section 5 refers to the tuning condition of a tuning section 11 in response to viewer's request of displaying the program guide. A program guide display section 6 displays a program guide including the uncommon program information with reference to the TS signal of the channel selected by the viewer. For example, it is assumed that the viewer watches a program broadcasted in the channel of service_ID=4 (which is included in the TS signal of TS_ID=30 according to FIG. 64). From the correlation table of FIG. 61, it is understood that the viewer watches a program of "Ryukun TV" which corresponds to a "B" station in FIG. 64. Thus, if the viewer requests the display of program guide, the program guide display section 6 displays a program guide including program information of the specified channel of service_ID=4 as well as program information of other channels of service_ID=5, 6, 7, 8, and 9 with reference to the information of FIGS. 62 and 63.

With this arrangement, it becomes possible to switch the content of the displayed program guide in accordance with the viewing condition of the viewer (i.e., in response to viewer's selection of a channel in this embodiment). Furthermore, producing the correlation table according to this embodiment makes it possible to display a program guide of another channel having a different transport stream but provided by the same broadcaster.

Thirteenth Embodiment

A thirteenth embodiment provides a system wherein the program information includes related data of a program to be reserved by a receiving apparatus. More specifically, a program (e.g., program number 10) includes the program information related data as well as audio and video data. The program information related data is produced by a relevant information producing section 51 of the program information producing apparatus 500 shown in FIG. 52. The produced program information related data is transmitted in the form of MPEG2 private section data. FIG. 54 shows an example of a program component arrangement (PMT) including the MPEG2 private section data. This example includes component PIDs, according to which 102 is allocated to the program information related data. FIG. 55 shows details of the program information related data which is referred to according to the component PID=102.

According to the program information related data shown in FIG. 55, the data type is "program reservation." The display start time is 10:10 on Dec. 4, 1997. The display end time is 10:12 on Dec. 4, 1997. The display position (center point) is (300, 200) in the given coordinates. A program guide display section 6 of the receiving apparatus shown in FIG. 53 displays a "reservation" icon with its center point positioned at (300, 200) from 10:10 to 10:12 on Dec. 4, 1997, according to the program information related data. In this case, the receiving apparatus stores a bit map video of the reservation icon beforehand and displays the icon at the designated coordinate position.

When the viewer selects the "reservation" icon, a reservation managing section 7 memorizes the program identifying information of a reserved program (service identifier: 100, program identifier: 10,000, and program start time: 1:05 on December 5) with reference to the transmitted program information related data.

As apparent from the foregoing description, this embodiment transmits the program information related data in synchronism with the broadcasting of a program. This program information related data is used for reserving the program Thus, it becomes possible to realize both the program guide display and the program reservation in accordance with the viewer's watching program. Furthermore, it is possible to include the control data of the program guide display in the program information related data. This allows the center system to precisely control the display of program guide.

Fourteenth Embodiment

A fourteenth embodiment provides a system wherein the program information includes instruction of the program guide display and a list of channels to be selected by a receiving apparatus. More specifically, a channel not broadcasting programs transmits the program information related data including the program guide display data. The program information related data is produced by the relevant information producing section 51 of the program information producing apparatus 500 shown in FIG. 52. The program component arrangement used in this case is shown in FIG. 56, wherein no audio and video components are included. Details of the program information related data is shown in FIG. 57. The referring method of the program information related data is substantially identical with that described in the thirteenth embodiment.

When the receiving apparatus 100 shown in FIG. 53 tunes in to this channel, no video is displayed since this channel broadcasts no programs. According to the program information related data shown in FIG. 57, the data type is "program guide display." The display start time is 10:10 on Dec. 4, 1997. The display end time is 10:12 on Dec. 4, 1997. The display position (center point) is (300, 200) in the given coordinates. The program guide display section 6 of the receiving apparatus shown in FIG. 53 displays a program guide with its center point positioned at (300, 200) from 10:10 to 10:12 on Dec. 4, 1997, according to the program information related data. In this case, the program guide display section 6 determines channels to be displayed with reference to a channel list in the program information related data. More specifically, the program guide is for channels 100, 101, 102 and 103 described in the channel list of FIG. 57. This arrangement allows each viewer to select a program from the displayed program guide to watch other program actually broadcasted.

As apparent from the foregoing description, the fourteenth embodiment produces the program information related data including the instruction of the program guide display and the list of channels to be selected by the receiving apparatus. This allows the viewers to select a program among channels relating to the viewer's watching program.

Fifteenth Embodiment

A fifteenth embodiment of the present invention provides a system wherein promotion is feasible by using a plurality of videos and sounds. In the program information producing apparatus 500 shown in FIG. 52, the relevant information producing section 51 produces program information related data including video display data of other program. FIG. 58 shows a program component arrangement of the program information related data. FIG. 59 shows details of the program information related data. The referring method of the program information related data is substantially identical with that described in the thirteenth embodiment, although the data type shown in FIG. 59 is "other channel video display."

When the viewer selects the channel of program number 10, the program output section 12 of the receiving apparatus 100 (FIG. 53) produces audio data of the program component identified by PID=101 as well as a plurality of videos of all channels described in the channel list of the program information related data identified by PID=102. Accordingly, the viewer can watch the plurality of videos of the programs while listening promotion sounds. The tuning section 11 of the receiving apparatus 100 periodically change the tuning frequency to receive the plurality of programs successively. The program output section 12 produces a combined video of the received programs, thereby displaying the plurality of programs at a time.

According to the above-described thirteenth to fifteenth embodiments, the program information related data are transmitted in the form of the private section data according to the standard of MPEG2. However, it is possible to use other type of data transmission using a table or a script.

Furthermore, according to the above-described twelfth to fifteenth embodiments, the receiving section of the receiving apparatus receives the program information. However, it is possible to use other appropriate media, such as FD and DVD, for storing and transmitting the program information, or it may be possible to use a terminal having the capability of storing the same.

In the explanation of the above-described twelfth to fifteenth embodiments, operation of the broadcast center is omitted. However, it should be understood that the program information is produced from the program schedule information sent from the audio/video and program information organizing system 1002 shown in FIG. 73. If the audio/video and program information organizing system is not provided, it will be possible to produce the program information from the program schedule information in the program information producing apparatus.

As apparent from the foregoing description, the fifteenth embodiment produces the program information related data including the list of channels to be promoted as well as the instruction of the program display in synchronism with the broadcasting of a program. This makes it possible to realize the promotion using a display screen consisting of dissected videos of the programs of other channels.

Sixteenth Embodiment

A sixteenth embodiment of the present invention provides a system producing both analog BS information and digital BS information. FIG. 70 is a block diagram showing the arrangement of a program information producing apparatus 500 in accordance with the sixteenth embodiment of the present invention. In the program information producing apparatus 500, a link information producing section 61 produces analog program information involving program link information describing the relationship to a relevant digital program. For example, an analog program may be identical with a digital program in program name and broadcast time but different in viewing fee. In such case, the difference is described as information other than program link information. FIGS. 65 and 66 show examples of digital BS program information and analog program information, respectively. For example, in the analog BS program information shown in FIG. 66, an analog BS program identified by program_ID=230 is linked with a digital BS program having program_ID=230 which corresponds to the "Alarm lock TV" program shown in the digital BS program (program—ID=30) in program name, broadcast time and program duration but different in viewing fee. Thus the viewing fee is described in the analog BS program information shown in FIG. 66. In other words, when the same information is described in the digital BS program information, the analog BS program information simply refers to it. Two kinds of program information data are transmitted through the digital BS service.

Figures 71, 72:
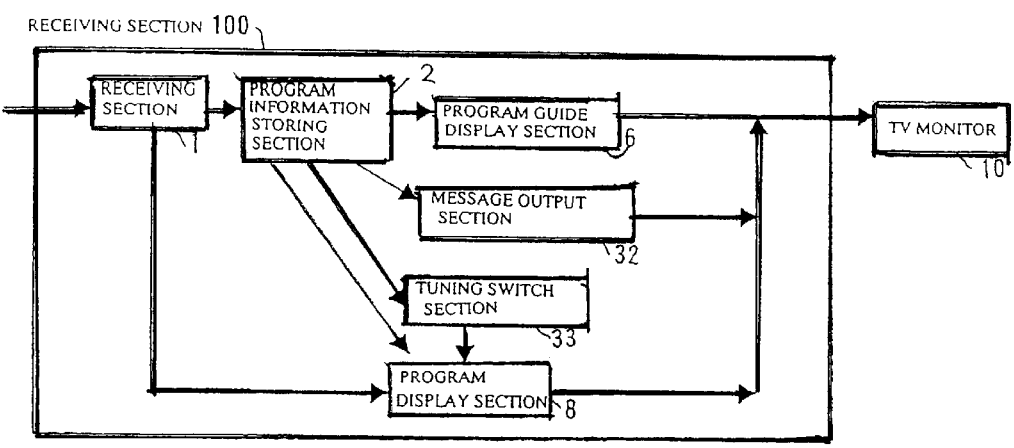
FIG. 71 is a block diagram showing the arrangement of a receiving apparatus in accordance with the sixteenth embodiment of the present invention.
FIG. 72 is a screen view showing both of analog and digital BS program guides in accordance with the sixteenth embodiment of the present invention.

FIG. 71 is a block diagram showing the arrangement of a receiving apparatus 100 in accordance with the sixteenth embodiment of the present invention. In the receiving apparatus 100, a program guide display section 6 displays a program guide of a linked channel with reference to the received program information. FIG. 67 shows details of the displayed program guide, wherein the program name "Alarm clock TV!" is displayed based on the information from the digital BS program information. It is possible for the program guide display section 6 to display both an analog BS program guide and a digital BS program guide simultaneously on the screen, as shown in FIG. 72.

When the viewer selects the "Alarm clock TV!" from the program guide shown in FIG. 67 and watches the same served from the analog BS, a message output section 32 displays a message that the same program is broadcasted through the digital BS (using a small space on the screen as shown in FIG. 68). It is possible to display the viewing fees different between the digital BS and the analog BS as such information is obtainable from the program information. When the viewer selects "stay on analog", the message disappears from the screen and the analog BS program is continuously displayed. When the viewer selects "transfer to digital", a tuning switch section 33 tunes in to the designated channel with reference to the digital BS program guide.

As a modification of the above-described sixteenth embodiment, it may be possible to skip the display of the message and automatically tune in to the designated channel. According to the above-described sixteenth embodiment, the linked programs are scheduled in the same time slot. It is however possible to link any programs scheduled in different time slots. In this case, the broadcast time is included in the program link information.

The linked channels may be completely identical in their content. FIG. 69 shows the channel link information used when the program organization is identical, which is produced by the link information producing section 61. FIG. 69 shows that an analog channel of BS 30 has the same content as that of the linked channel (service_ID=300) of the digital BS. When the viewer requests the display of the analog BS program guide, the program guide display section 6 displays the analog BS program guide with reference to the program information of the digital BS in the same manner as the display of the linked program.

Furthermore, according to the above-described sixteenth embodiment, the receiving section of the receiving apparatus receives the program information. However, it is possible to use other appropriate media, such as FD and DVD, for storing and transmitting the program information, or it may be possible to use a terminal having the capability of storing the same.

In the explanation of the above-described sixteenth embodiment, operation of the broadcast center is omitted. However, it should be understood that the program information is produced from the program schedule information sent from the audio/video and program information organizing system 1002 shown in FIG. 73. If the audio/video and program information organizing system is not provided, it will be possible to produce the program information from the program schedule information in the program information producing apparatus.

As described above, the sixteenth embodiment produces the program information describing the linkage or correlation between different networks. Thus, the sixteenth embodiment allows the viewers to check the difference between the linked channels in their program contents, fees and qualities when the same program is broadcasted in both analog and digital channels through the simulcast service.

As apparent from the foregoing description, the first embodiment of the present invention makes it possible to display a program guide including a personal channel consisting of the programs selected according to the search condition given from the viewer. This arrangement is helpful for the viewers in selecting favorable programs from numerous programs receivable by his/her receiving apparatus. Furthermore, as an independent channel is assigned to the searched programs, the viewers can continuously watch the favorable programs without changing the channel. Providing the display of program fees is effective to facilitate the program selection. Thus, the first embodiment of the present invention improves the conspicuousness of the program guide.

Furthermore, the second embodiment of the present invention allows the viewer to modify the program guide through a manual operation when the program guide does not include any favorable program. Thus, it becomes possible to reschedule the personal channel.

Furthermore, the third embodiment of the present invention allows the viewers to select a preferable program schedule among a plurality of routes considering the charging fee or viewer's personal schedule, for example, when the viewer has preferable programs in mind but has not yet fixed the schedule. Thus, it becomes possible to reduce the burden of the viewers in the selection of programs.

Furthermore, the fourth embodiment of the present invention stores the advertisement stream in the receiving apparatus. Thus, it becomes possible to display the sponsor's statement or CM together with the program guide on the screen of the TV monitor.

Furthermore, the fifth embodiment of the present invention reduces the size of the program video in response to a viewer's request and displaying the program guide in a given space on the screen. Thus, the viewers can watch the program guide without interrupting the viewing of the program.

Furthermore, the sixth embodiment of the present invention makes it possible to provide the program guide capable of displaying a sponsor name paired with a program name. This is preferable in that displayed program guide does not substantially reduce the viewer's chance of watching sponsor name or sponsor information.

Furthermore, the seventh embodiment of the present invention substantially expands the applicability of CM by simply adding the CM information to the CM broadcasting system. The stored CM information is reusable when the program guide is displayed, increasing the chance of CM reproduction. This is basically acceptable for the sponsors. Thus, coexistence of the program guide and CM is appropriately realized.

Furthermore, the eighth embodiment of the present invention sets a plurality of charge ranks according to the recording or viewing type of the CM. Thus, it becomes possible to set a variety of charge ranks according to advertisement activities of the broadcasters. For example, the fee for the recording with no CM is expensive because no advertisement income is expected. Furthermore, such a charge system will effectively prevent the viewers from cutting the CM thoughtlessly by utilizing the CM positional information.

Furthermore, the ninth and tenth embodiments of the present invention surely perform the playback of the CM predetermined times. Thus, the broadcasters can provide the guaranteed CM playback system for each sponsor.

Furthermore, the eleventh embodiment of the present invention produces the next program information to be tuned in to during or after the broadcasting of the present program. The produced next program information is displayed on the screen of the receiving apparatus so as to encourage the viewer to select a favorable one.

Furthermore, the twelfth embodiment of the present invention makes it possible to switch the content of the displayed program guide in accordance with the viewing condition of the viewer. Furthermore, producing the correlation table according to this embodiment makes it possible to display a program guide of another channel having a different transport stream but provided by the same broadcaster.

Furthermore, the thirteenth embodiment of the present invention transmits the program information related data in synchronism with the broadcasting of a program. This program information related data is used for reserving the program Thus, it becomes possible to realize both the program guide display and the program reservation in accordance with the viewer's watching program. Furthermore, it is possible to include the control data of the program guide display in the program information related data. This allows the center system to precisely control the display of program guide.

Furthermore, the fourteenth embodiment of the present invention produces the program information related data including the instruction of the program guide display and the list of channels to be selected by the receiving apparatus. This allows the viewers to select a program among channels relating to the viewer's watching program.

Furthermore, the fifteenth embodiment of the present invention produces the program information related data including the list of channels to be promoted as well as the instruction of the program display in synchronism with the broadcasting of a program. This makes it possible to realize the promotion using a display screen consisting of dissected videos of the programs of other channels.

Furthermore, the sixteenth embodiment of the present invention produces the program information describing the linkage or correlation between different networks. Thus, the sixteenth embodiment allows the viewers to check the difference between the linked channels in their program contents, fees and qualities when the same program is broadcasted in both analog and digital channels through the simulcast service.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A receiving apparatus comprising:
    a program information storing section for storing program information that has been broadcast from a plurality of broadcasters, said program information including program name, program start time, and channel discriminating information that are necessary for a standard program guide covering all programs of each broadcaster's channel;
    a search condition input section for inputting search conditions;
    a program information search section for searching said program information stored in said program information storing section according to said search conditions entered by said search condition input section and for producing a personal channel consisting of programs resulting from said search and arranged so as not to overlap with each other in broadcast time; and
    a program guide display section for displaying a combined program guide including said personal channel resulting from said search performed by said program information search section in addition to the broadcasters' channels comprising said standard program guide.

2. The receiving apparatus in accordance with claim 1, further comprising a tuning switch section for tuning in to a program of said personal channel displayed by said program guide display section in response to selection of said personal channel listed on said program guide.

3. The receiving apparatus in accordance with claim 1, further comprising a receiving section for receiving said program name, said program start time, and said channel discriminating information.

4. A receiving apparatus comprising:
    a program information storing section for storing program information including program name, program start time, and channel discriminating information;
    a program information search section for searching said program information stored in said program information storing section according to designated search conditions and for producing personalized program information resulting from the search; and
    a program guide display section for displaying a program guide including a personal channel consisting of programs included in said personalized program information resulting from said search performed by said program information search section and arranged so as not to overlap with each other in broadcast time;
    wherein said program information search section searches said program information by the order of broadcast time of program, and performs scheduling of programs of said personal channel so that broadcast times do not overlap with each other when the personalized program information includes programs of a plurality of broadcasters.

5. A The receiving apparatus in accordance with claim 4, wherein said program guide display section displays a charged sum amount of pay-per-view programs when said personalized program information involves any pay-perview program.

6. The receiving apparatus in accordance with claim 4, wherein said program information search section produces a plurality groups of program information when a plurality of schedules are found as a result of performed search.

* * * * *